United States Patent
Ryu et al.

(10) Patent No.: US 12,302,123 B2
(45) Date of Patent: May 13, 2025

(54) INTER-USER EQUIPMENT COORDINATION FOR BEAMFORMED COMMUNICATIONS

(71) Applicant: QUALCOMM Incorporated, San Diego, CA (US)

(72) Inventors: Jung Ho Ryu, Fort Lee, NJ (US); Sony Akkarakaran, Poway, CA (US); Gabi Sarkis, San Diego, CA (US); Hua Wang, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 17/943,692

(22) Filed: Sep. 13, 2022

(65) Prior Publication Data

US 2024/0089746 A1    Mar. 14, 2024

(51) Int. Cl.
*H04W 72/56* (2023.01)
*H04W 16/28* (2009.01)
(Continued)

(52) U.S. Cl.
CPC .......... *H04W 16/28* (2013.01); *H04W 24/08* (2013.01); *H04W 28/26* (2013.01); *H04W 72/56* (2023.01)

(58) Field of Classification Search
CPC ..... H04W 16/28; H04W 24/08; H04W 28/26; H04W 72/56; H04W 72/02; H04W 72/046; H04W 76/14; H04W 72/25
See application file for complete search history.

(56) References Cited

U.S. PATENT DOCUMENTS

| | | | |
|---|---|---|---|
| 2022/0104263 A1* | 3/2022 | Dutta | H04W 24/08 |
| 2023/0164745 A1* | 5/2023 | Khoryaev | H04W 72/25 |
| | | | 370/329 |

(Continued)

FOREIGN PATENT DOCUMENTS

| | | | |
|---|---|---|---|
| WO | WO-2022047460 A1 | 3/2022 | |
| WO | WO-2022159346 A2 * | 7/2022 | H04L 5/0037 |

OTHER PUBLICATIONS

Fujitsu: "Considerations on Inter-UE Coordination for Mode 2 Enhancements", 3GPP TSG RAN WG 1 #107bis-e, R1-2200126, 3rd Generation Partnership Project, Mobile Competence Centre, 650, Route Des Lucioles, F-06921 Sophia-Antipolis Cedex, France, vol. RAN WG1, No. e-Meeting, Jan. 17, 2022-Jan. 25, 2022, Jan. 11, 2022, 14 Pages, XP052092971, Paragraph [02.2].

(Continued)

*Primary Examiner* — Lakeram Jangbahadur
(74) *Attorney, Agent, or Firm* — Holland & Hart LLP

(57) ABSTRACT

Methods, systems, and devices for wireless communications that support inter-user equipment (UE) coordination (IUC) for beamformed communications are described. A first UE may receive, using a first spatial filter, a first sidelink control message including a first sidelink resource reservation associated with a second UE. Additionally, or alternatively, the first UE may receive, using a second spatial filter, a second sidelink control message including a second sidelink resource reservation associated with a third UE. The first UE may transmit, to the second UE or the third UE, an IUC message that indicates a conflict between the first sidelink resource reservation and the second sidelink resource reservation. The IUC message that indicates a conflict may be based on a relationship between the first spatial filter used to receive the first sidelink resource reservation and the second (Continued)

spatial filter used to receive the second sidelink resource reservation.

28 Claims, 15 Drawing Sheets

(51) Int. Cl.
*H04W 24/08* (2009.01)
*H04W 28/26* (2009.01)

(56) References Cited

U.S. PATENT DOCUMENTS

2023/0189389 A1\* 6/2023 Hui ...................... H04L 1/1812
370/329
2023/0217468 A1\* 7/2023 Hui ...................... H04W 72/25
370/329

OTHER PUBLICATIONS

International Search Report and Written Opinion—PCT/US2023/072958—ISA/EPO—Nov. 27, 2023 (2204824WO).

\* cited by examiner

INTER-USER EQUIPMENT COORDINATION FOR BEAMFORMED COMMUNICATIONS

FIELD OF TECHNOLOGY

The following relates to wireless communications, including inter-user equipment (UE) coordination (IUC) for beamformed communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A multiple-access wireless communications system may include one or more network entities, each supporting wireless communication for devices such as user equipment (UE). Some wireless communications systems may support sidelink communications between UEs. In such systems, UEs may coordinate communications on sidelink resources to avoid interference and collisions.

SUMMARY

The described techniques relate to improved methods, systems, devices, and apparatuses that support inter-user equipment (UE) coordination (IUC) for beamformed communications. For example, the described techniques provide for integrating UE beamforming with IUC messaging to more efficiently identify and address scheduling conflicts between resource reservations using beamformed sidelink communications.

In some examples, a receiving UE may receive sidelink control information (SCI) from both a first and a second transmitting UE, the SCI reserving resources for the first and second transmitting UE to use. The receiving UE may determine that there is a resource conflict between the resources reserved by the SCI, and the receiving UE may transmit a resource conflict indication to at least one of the transmitting UEs. For example, if the first and second beams used to receive the first and second resource reservations overlap substantially at the receiving UE, the receiving UE may send a conflict indication to the transmitting UE that transmitted the resource reservation with a lower priority (corresponding to a higher priority value). If, however, the first and second beams that the receiving UE uses to receive the resource reservations do not significantly overlap, the receiving UE may determine whether there is a conflict between the resource reservations based on receiving capabilities of the UE. For example, the receiving UE may not be able to receive on two or more beams simultaneously. The receiving UE may use the same beam to send the resource conflict indication that was used to receive the conflicting resource reservation. Similarly, the transmitting UE may receive conflict indications using the same beam that it uses to transmit resource reservation SCI.

A method for wireless communication at a first UE is described. The method may include receiving, using a first spatial filter, a first sidelink control message including a first sidelink resource reservation associated with a second UE, receiving, using a second spatial filter, a second sidelink control message including a second sidelink resource reservation associated with a third UE, and transmitting, to the second UE or to the third UE, an IUC message that indicates a conflict between the first sidelink resource reservation and the second sidelink resource reservation based on a relationship between the first spatial filter used to receive the first sidelink resource reservation and the second spatial filter used to receive the second sidelink resource reservation.

An apparatus for wireless communication at a first UE is described. The apparatus may include a processor, memory coupled with the processor, and instructions stored in the memory. The instructions may be executable by the processor to cause the apparatus to receive, using a first spatial filter, a first sidelink control message including a first sidelink resource reservation associated with a second UE, receive, using a second spatial filter, a second sidelink control message including a second sidelink resource reservation associated with a third UE, and transmit, to the second UE or to the third UE, an IUC message that indicates a conflict between the first sidelink resource reservation and the second sidelink resource reservation based on a relationship between the first spatial filter used to receive the first sidelink resource reservation and the second spatial filter used to receive the second sidelink resource reservation.

Another apparatus for wireless communication at a first UE is described. The apparatus may include means for receiving, using a first spatial filter, a first sidelink control message including a first sidelink resource reservation associated with a second UE, means for receiving, using a second spatial filter, a second sidelink control message including a second sidelink resource reservation associated with a third UE, and means for transmitting, to the second UE or to the third UE, an IUC message that indicates a conflict between the first sidelink resource reservation and the second sidelink resource reservation based on a relationship between the first spatial filter used to receive the first sidelink resource reservation and the second spatial filter used to receive the second sidelink resource reservation.

A non-transitory computer-readable medium storing code for wireless communication at a first UE is described. The code may include instructions executable by a processor to receive, using a first spatial filter, a first sidelink control message including a first sidelink resource reservation associated with a second UE, receive, using a second spatial filter, a second sidelink control message including a second sidelink resource reservation associated with a third UE, and transmit, to the second UE or to the third UE, an IUC message that indicates a conflict between the first sidelink resource reservation and the second sidelink resource reservation based on a relationship between the first spatial filter used to receive the first sidelink resource reservation and the second spatial filter used to receive the second sidelink resource reservation.

In some examples of the method, apparatuses, and non-transitory computer-readable medium described herein, the first sidelink resource reservation indicates a first sidelink resource reserved by the second UE for transmission to the first UE and the method, apparatuses, and non-transitory computer-readable medium may include further operations, features, means, or instructions for determining that a first beam corresponding to the first spatial filter at least partially overlaps with a second beam corresponding to the second spatial filter, where transmitting, to the second UE or the third UE, the IUC message that indicates the conflict between the first sidelink resource reservation and the second sidelink resource reservation may be based on the first beam at least partially overlapping with the second beam.

Some examples of the method, apparatuses, and non-transitory computer-readable medium described herein may further include operations, features, means, or instructions for comparing a first priority value of the first sidelink resource reservation associated with the second UE to a second priority value of the second sidelink resource reservation associated with the third UE, where the IUC message may be transmitted to the second UE based on the first priority value being greater than the second priority value.

In some examples of the method, apparatuses, and non-transitory computer-readable medium described herein, the first sidelink resource reservation and the second sidelink resource reservation at least partially overlap in time and frequency.

In some examples of the method, apparatuses, and non-transitory computer-readable medium described herein, the first beam corresponding to the first spatial filter at least partially overlaps with the second beam corresponding to the second spatial filter based on a quasi-colocation relationship between the first spatial filter and the second spatial filter.

In some examples of the method, apparatuses, and non-transitory computer-readable medium described herein, determining that the first beam corresponding to the first spatial filter at least partially overlaps with the second beam corresponding to the second spatial filter may include operations, features, means, or instructions for determining that a signal power for signaling received from the third UE using the first spatial filter satisfies a threshold and determining that a signal power for signaling received from the second UE using the second spatial filter satisfies the threshold.

In some examples of the method, apparatuses, and non-transitory computer-readable medium described herein, the first spatial filter and the second spatial filter may be identical.

In some examples of the method, apparatuses, and non-transitory computer-readable medium described herein, the first spatial filter and the second spatial filter may have identical spatial receiver parameters.

In some examples of the method, apparatuses, and non-transitory computer-readable medium described herein, the first sidelink resource reservation indicates a first sidelink resource reserved by the second UE for transmission to the first UE and the method, apparatuses, and non-transitory computer-readable medium may include further operations, features, means, or instructions for determining that the first sidelink resource reservation and the second sidelink resource reservation at least partially overlap in time, where transmitting, to the second UE or to the third UE, the IUC message that indicates the conflict between the first sidelink resource reservation and the second sidelink resource reservation may be based on the first sidelink resource reservation and the second sidelink resource reservation at least partially overlapping in time.

Some examples of the method, apparatuses, and non-transitory computer-readable medium described herein may further include operations, features, means, or instructions for comparing a first priority value of the first sidelink resource reservation associated with the second UE to a second priority value of the second sidelink resource reservation associated with the third UE, where the IUC message may be transmitted to the second UE based on the first priority value being greater than the second priority value.

In some examples of the method, apparatuses, and non-transitory computer-readable medium described herein, a first beam corresponding to the first spatial filter and a second beam corresponding to the second spatial filter may be spatially separated.

In some examples of the method, apparatuses, and non-transitory computer-readable medium described herein, the first spatial filter and the second spatial filter may have different spatial receiver parameters.

Some examples of the method, apparatuses, and non-transitory computer-readable medium described herein may further include operations, features, means, or instructions for transmitting, to the second UE, the IUC message using the first spatial filter based on the first UE using the first spatial filter to receive the first sidelink control message.

Some examples of the method, apparatuses, and non-transitory computer-readable medium described herein may further include operations, features, means, or instructions for transmitting, to the third UE, the IUC message using the second spatial filter based on the first UE using the second spatial filter to receive the second sidelink control message.

Some examples of the method, apparatuses, and non-transitory computer-readable medium described herein may further include operations, features, means, or instructions for receiving, using a third spatial filter corresponding to a first beam, a third sidelink control message indicating a third sidelink resource reserved by a fourth UE for transmission to the first UE, receiving, using a fourth spatial filter corresponding to a second beam, a fourth sidelink control message indicating a fourth sidelink resource reserved by a fifth UE for transmission to a sixth UE, where the fourth sidelink resource at least partially overlaps with the third sidelink resource in time and frequency, refraining from transmitting a second IUC message that indicates a conflict between the third sidelink resource and the fourth sidelink resource based on the first beam being at least partially non-overlapping the second beam, and receiving, using the first spatial filter, a first sidelink transmission from the fourth UE via the third sidelink resource.

In some examples of the method, apparatuses, and non-transitory computer-readable medium described herein, the IUC message includes a scheme-two IUC message.

A method for wireless communication at a second UE is described. The method may include transmitting, using a first spatial filter, a first sidelink control message including a first sidelink resource reservation and receiving, using the first spatial filter, an IUC message from a first UE that indicates a conflict between the first sidelink resource reservation and a second sidelink resource reservation associated with a third UE, where the second UE uses the first spatial filter to receive the IUC message based on using the first spatial filter to transmit the first sidelink control message.

An apparatus for wireless communication at a second UE is described. The apparatus may include a processor, memory coupled with the processor, and instructions stored in the memory. The instructions may be executable by the processor to cause the apparatus to transmit, using a first spatial filter, a first sidelink control message including a first sidelink resource reservation and receive, using the first spatial filter, an IUC message from a first UE that indicates a conflict between the first sidelink resource reservation and a second sidelink resource reservation associated with a third UE, where the second UE uses the first spatial filter to receive the IUC message based on using the first spatial filter to transmit the first sidelink control message.

Another apparatus for wireless communication at a second UE is described. The apparatus may include means for transmitting, using a first spatial filter, a first sidelink control message including a first sidelink resource reservation and means for receiving, using the first spatial filter, an IUC message from a first UE that indicates a conflict between the first sidelink resource reservation and a second sidelink resource reservation associated with a third UE, where the second UE uses the first spatial filter to receive the IUC message based on using the first spatial filter to transmit the first sidelink control message.

A non-transitory computer-readable medium storing code for wireless communication at a second UE is described. The code may include instructions executable by a processor to transmit, using a first spatial filter, a first sidelink control message including a first sidelink resource reservation and receive, using the first spatial filter, an IUC message from a first UE that indicates a conflict between the first sidelink resource reservation and a second sidelink resource reservation associated with a third UE, where the second UE uses the first spatial filter to receive the IUC message based on using the first spatial filter to transmit the first sidelink control message.

Some examples of the method, apparatuses, and non-transitory computer-readable medium described herein may further include operations, features, means, or instructions for transmitting, using a second spatial filter, a second sidelink control message including a third sidelink resource reservation, where the first sidelink resource reservation and the third sidelink resource reservation both map to an IUC message opportunity and refraining from monitoring resources of the IUC message opportunity for a second IUC message associated with the third sidelink resource reservation, where the IUC message that indicates the conflict between the first sidelink resource reservation and the second sidelink resource reservation may be received via the resources of the IUC message opportunity based on refraining from monitoring the resources of the IUC message opportunity for the second IUC message.

Some examples of the method, apparatuses, and non-transitory computer-readable medium described herein may further include operations, features, means, or instructions for comparing a first priority value of the first sidelink resource reservation to a second priority value of the third sidelink resource reservation, where the IUC message may be received using the first spatial filter based on the first priority value being greater than the second priority value.

Some examples of the method, apparatuses, and non-transitory computer-readable medium described herein may further include operations, features, means, or instructions for refraining from monitoring the resources of the IUC message opportunity for the second IUC message associated with the third sidelink resource reservation may be based on the first priority value being greater than the second priority value.

In some examples of the method, apparatuses, and non-transitory computer-readable medium described herein, the IUC message includes a scheme-two IUC message.

DETAILED DESCRIPTION

Figure 1:
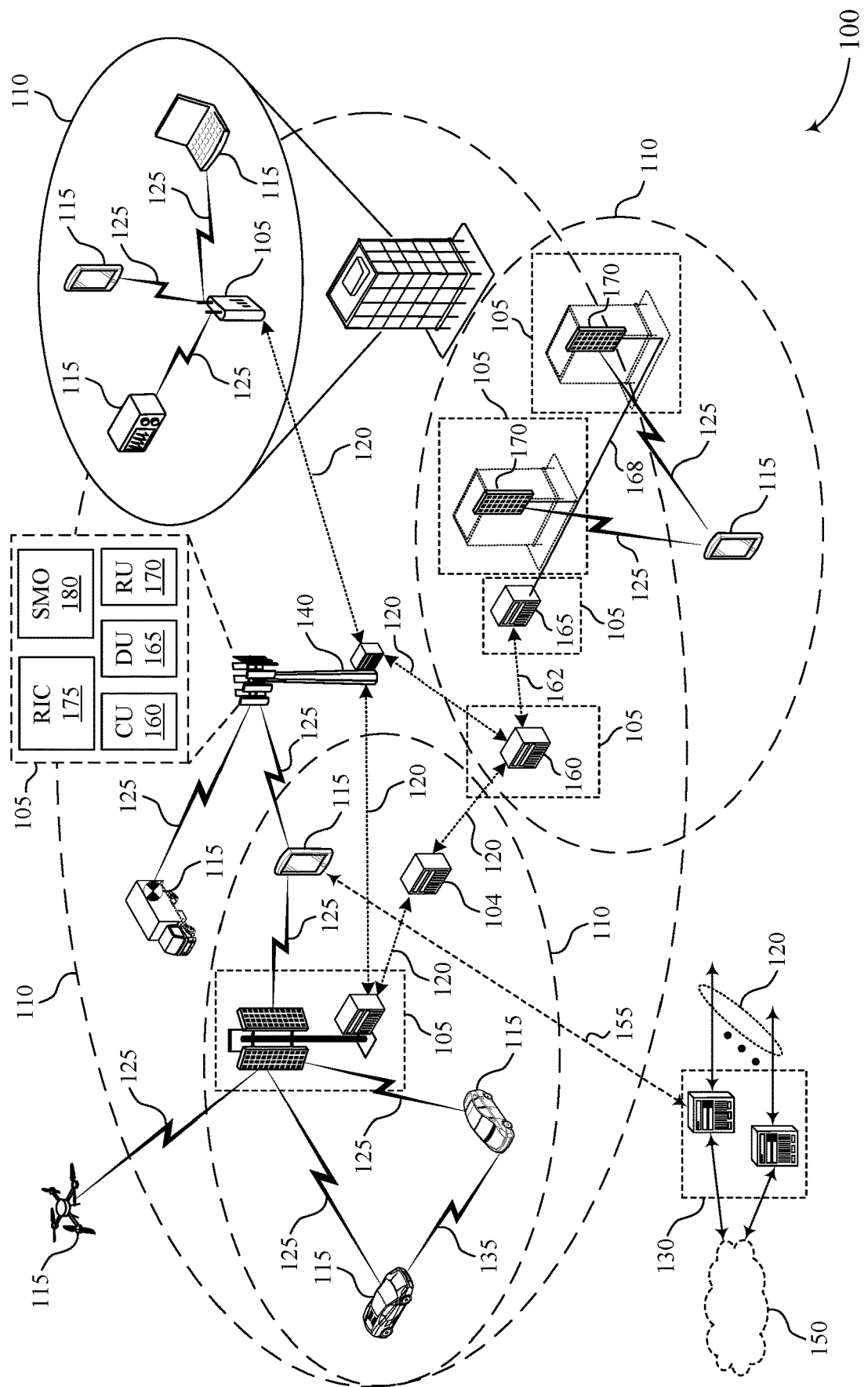
FIGS. 1 and 2 illustrate examples of wireless communications systems that support inter-user equipment (UE) coordination (IUC) for beamformed communications in accordance with one or more aspects of the present disclosure.

Some wireless communications systems may support sidelink or device-to-device communications, where two or more user equipment (UE) may communicate using a sidelink connection. For example, in a first sidelink mode (e.g., Mode 1), the network manages and assigns resources for the sidelink UEs to use, and in a second sidelink mode (e.g., Mode 2), the UEs may determine which resources to use. In Mode 2, a receiving UE may perform channel sensing to determine which resources are available for sidelink transmissions, which resources are reserved, and for which resources there may be scheduling conflicts.

To manage resource allocation in Mode 2, a UE may support inter-UE coordination (IUC) to effectively coordinate resource use between UEs. For example, one or more transmitting UEs may select communication resources to use for a future sidelink transmission to a receiving UE, and the one or more transmitting UEs may transmit one or more indications of these resource reservation(s) via sidelink control information (SCI) to a nearby receiving UE. This receiving UE may receive multiple resource reservation indications from the transmitting UEs via one or more receiving beams, and in some cases, may identify a conflict between reserved resources (e.g., the transmitting UEs may attempt to reserve the same resource or resources that overlap at least partially in time, frequency, or both). To mitigate such conflicts, the receiving UE may transmit resource conflict indications (e.g., IUC messages) to at least one of the transmitting UEs to notify the UE of the conflict. Then, based on the received conflict message, the UE that received the IUC message may drop or reschedule the transmission.

To support efficient conflict determination and IUC signaling for sidelink communications, a UE may further integrate various beamforming considerations with IUC messaging to identify and address scheduling conflicts between resource reservations using beamformed sidelink communications. In some examples, the receiving UE (e.g., UE-A) may receive SCI from both a first and a second transmitting UE that each indicate resource reservations for the first and second transmitting UE. The receiving UE may determine that there is a resource conflict between the resources reserved by the SCI, and may transmit a resource conflict indication (e.g., an IUC message) to one of the transmitting UEs to notify the UE of the determined conflict. In some examples, the receiving UE may determine resource conflict based on different beams it uses to receive the SCI from the different transmitting UEs. For example, if the first and second beams used to receive the first and second resource reservations overlap substantially at the receiving UE, the receiving UE may send a conflict indication to the transmitting UE (e.g., UE-B) that transmitted the resource reservation with a lower priority (corresponding to a higher priority value). In some other examples, the first and second beams that the receiving UE uses to receive the resource reservations may not significantly overlap. If the beams do not significantly overlap, the receiving UE may determine whether there is a conflict between the resource reservations based on various factors such as UE receiving capabilities. For example, the receiving UE may not be able to receive on two or more beams simultaneously, so if the two resources are reserved such that the receiving UE would receive both transmissions on a same beam, the receiving UE may determine a conflict exists. Thus, among other aspects of the present disclosure, a receiving UE may determine whether a conflict exists and whether to transmit an IUC conflict indication based on which beams are associated with resource reservations by other UEs.

Additionally, a transmitting UE may monitor for an IUC conflict message using the same beam that it used to send the preceding resource reservation. Thus, for example, the transmitting UE may receive conflict indications using the same beam that the transmitting UE uses to transmit an associated resource reservation SCI. Priority-based rules are also described for handling cases where a UE transmits multiple resource reservations. Additionally, a receiving UE may use the same beam to send a resource conflict indication that the receiving UE uses to receive a conflicting resource reservation.

Aspects of the disclosure are initially described in the context of wireless communications systems. Aspects of the disclosure are further illustrated by and described with wireless communications diagrams, a time resource diagram, grid resource diagrams, and a process flow diagram. Aspects of the disclosure are further illustrated by and described with reference to apparatus diagrams, system diagrams, and flowcharts that relate to inter-user equipment coordination for beamformed communications.

FIG. 1 illustrates an example of a wireless communications system 100 that supports IUC for beamformed communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support IUC for beamformed communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In wireless communications system 100, UEs 115 may perform sidelink communications over one or more sidelink channels. For instance, sidelink data transmissions may be over a physical sidelink shared channel (PSSCH), sidelink discovery expression transmissions may be over a physical sidelink discovery channel (PSDCH) (e.g., to allow proximal devices to discover each other's presence), SCI transmissions may be over a physical sidelink control channel (PSCCH), sidelink feedback transmissions may be over a physical sidelink feedback channel (PSFCH), and sidelink broadcast transmissions may be over a physical sidelink broadcast channel (PSBCH). Sidelink communications may also include transmitting reference signals from one UE 115 to another UE 115.

UEs 115 may communicate using two sidelink communication modes. In a first sidelink mode (Mode 1), the network (e.g., a network entity such as a gNB) manages and assigns the resources and determines which resources the UEs 115 use for sidelink communications. In a second sidelink mode (Mode 2), the UEs 115 determine which resources to use for sidelink communication. That is, Mode 2 sidelink communications may be supported without the presence of a central entity (e.g., such as a network entity 105). In Mode 2, a receiving UE 115 may perform channel sensing to determine which resources are available for sidelink transmissions, which are reserved, and for which there may be conflicts. For example, the UE 115 may perform channel sensing to determine resource usage of other nearby sidelink UEs. The transmitting UE 115 may transmit SCI to reserve communication resources for future sidelink communications. To manage resource allocation in Mode 2, a UE 115 may support IUC to effectively coordinate resource use between UEs.

In some cases, to improve scheduling and avoid interference and collisions (e.g., in Mode 2 sidelink communications), the UEs 115 may exchange messages such as such as IUC messages to coordinate communications on sidelink resources. In some implementations, IUC messaging may support two schemes. A first scheme (scheme 1) may enable the sidelink transmitting UE 115 to select, or reselect, communication resources with assistance from nearly sidelink UEs 115. Nearby sidelink UEs 115 may indicate which resource they prefer or do not prefer the sidelink transmitting UE 115 use to communicate. Scheme 1 may be further divided into two parts. First, a request from the transmitting UE 115 may trigger assistance information to be transmitted by another UE 115. Second, the satisfying of a condition, or the satisfying of a threshold, may trigger the transmission of assistance information by the transmitting UE. In a second scheme (scheme 2), the transmitting UE 115 may select communication resources and transmit resource reservations, and a nearly sidelink UE 115 may indicate to the sidelink transmitting UE 115 that the sidelink UE 115 has a conflict with one of the selected resources by the transmitting UE 115.

In some examples, UEs 115 may use techniques of Scheme 2 IUC to reserve resources and communicate resource conflicts. The receiving UE 115 (e.g., UE-A) may receive two transmission resource reservations from two transmitting UEs 115, and the resources may overlap (e.g., partially or fully). In some examples, the receiving UE 115 may be the identified recipient of one or more of the resource reservations, or the destination UE 115. The transmitting UE 115 may reserve transmitting resources to transmit to the receiving UE 115, where the receiving UE 115 is the destination UE. The receiving UE 115 (e.g., UE-A) may determine to which transmitting UE 115 to transmit a resource conflict indication, and the receiving UE 115 may transmit the resource conflict indication to the determined UE 115 (e.g., UE-B). The resource conflict indication transmitted to the UE-B (e.g., transmitting UE 115) may indicate one or more resources are in conflict. The receiving UE-B (e.g., transmitting UE 115) may select another transmitting resource.

Techniques are described herein to integrate UE beamforming with IUC messaging to more efficiently identify and address scheduling conflicts between resource reservations using beamformed sidelink communications. In some examples, the receiving UE 115 may receive SCI from both a first and a second transmitting UE 115. The receiving UE 115 (e.g., the UE-A) may determine there is a resource conflict and transmit a resource conflict indication to a transmitting UE. For example, if the first and second beams used to receive the first and second resource reservations overlap substantially at the receiving UE 115, the receiving UE 115 may send a conflict indication to the transmitting UE 115 that transmitted the resource reservation with a lower priority (corresponding to a higher priority value). The transmitting UE 115 with lower priority may be identified as UE-B. In some other examples, the first and second beams that the receiving UE 115 uses to receive the resource reservations may not significantly overlap. If the beams do not significantly overlap, the UE 115 may determine whether there is a conflict, for example, the receiving UE 115 may not be able to receive on two or more beams simultaneously. The receiving UE 115 may use the same beam to send the resource conflict indication that was used to receive the conflicting resource reservation. Similarly, the transmitting UE 115 may receive conflict indications using the same beam that it uses to transmit resource reservation SCI, and the transmitting UE 115 may determine which beam to receive a conflict indication based on priority level of the scheduled resources.

Figure 2:
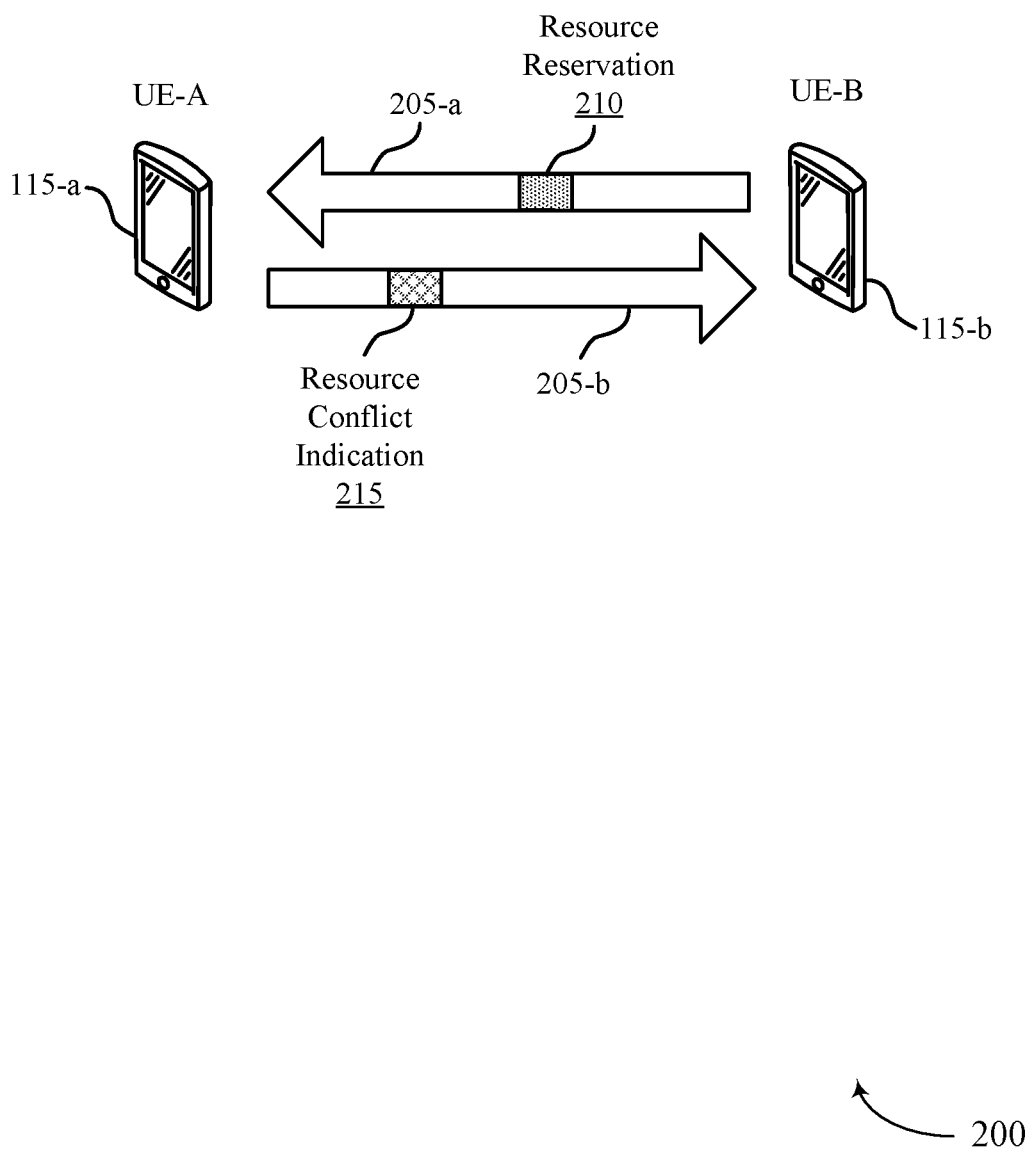

FIG. 2 illustrates an example of a wireless communications system 200 that supports IUC for beamformed communications in accordance with one or more aspects of the present disclosure. For example, the wireless communications system 200 may support sidelink communications between a UE 115-a and a UE 115-b, which may be examples of UEs 115 described with reference to FIG. 1. For instance, the UE 115-a may be an example of a UE-A and the UE 115-b may be an example of a UE-B.

The UE 115-a and the UE 115-b may communicate via a sidelink channel 205-a and sidelink channel 205-b. In some examples, the UE 115-a (e.g., receiving UE-A) may receive a resource reservation 210 from the UE 115-b (e.g., transmitting UE-B). The UE 115-a may determine potential conflicts associated with the resource reservation 210, and may transmit a resource conflict indication 215 to indicate one or more possible or expected resource conflicts to the UE 115-b. The resource reservation 210 may include SCI information to reserve one or more resources, and the resource conflict indication 215 may include an IUC indication. The UE 115-b may transmit the resource reservation 210 to the UE 115-a to notify the UE 115-a of reserved resources, then the UE 115-b may receive the resource conflict indication 215 from the UE 115-a, and the UE 115-b may select or reselect resources based on the resource conflict indication 215.

The UE 115-a may detect expected or potential resource conflicts associated with the SCI sent by the UE 115-b. In some examples, UE 115-a may be a destination UE of conflicting transport blocks scheduled by the UE 115-b, where the resources reserved to transmit the transport blocks may also be conflicting. In some examples, another UE may receive a transport block transmitted by the UE 115-b, and whether the other UE is defined as the UE 115-a may be preconfigured. The UE 115-b may transmit the resource reservation 210, which may include SCI, on a PSCCH or PSSCH indicating reserved resources to be used for transmission. The UE 115-b may receive the resource conflict indication 215, such as information included in an IUC message, from the UE 115-a indicating potential resource conflicts for the reserved resources, and UE 115-b may perform resource re-selection based on the resource conflict indication 215. In some examples, a bit (e.g., Indication-UEB) may be included in SCI (e.g., format 1-A) to indicate whether the UE scheduling a conflicting transport block is the UE 115-b (e.g., the UE-B) or whether the UE scheduling the conflicting transport block is not the UE 115-b (e.g., if the bit indicaitonUEBScheme2 is preconfigured to be enabled). Scheme 2 IUC may be enabled, disabled, or may be pre-configured.

In some examples, the UE 115-a may detect potential resource conflicts and send resource conflict indication 215 based on various beamforming implementations. For example, in some cases, the UE 115-a may determine whether a conflict exists for the resource reservation 210 based on different beams that the UE 115-a uses to receive the resource reservation 210, based on whether the UE 115-a is an intended recipient of the transmission associated with the resource reservation 210, or both.

Figure 3A:
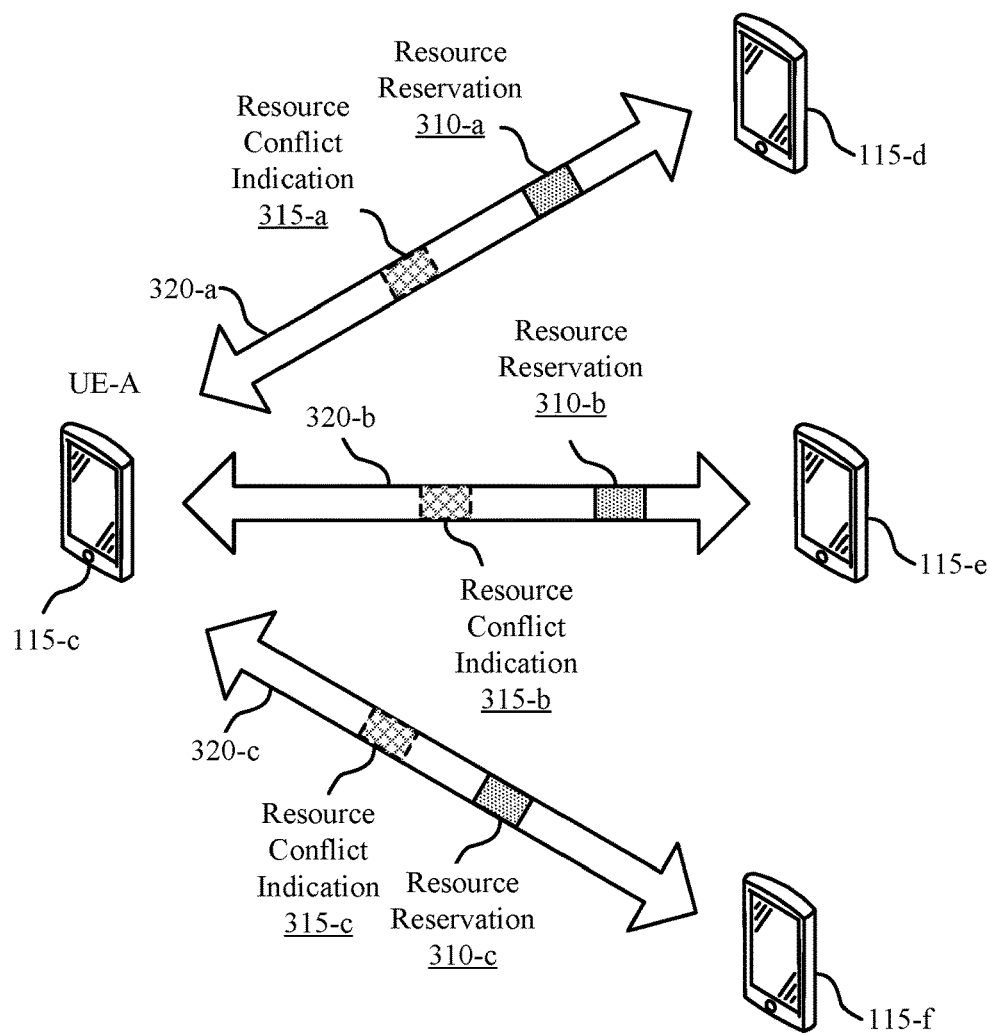
FIG. 3A illustrates an example of a wireless communications system and FIG. 3B illustrates an example of a grid resource diagram, each of which support IUC for beamformed communications in accordance with one or more aspects of the present disclosure.

FIG. 3A illustrates an example of a wireless communications system 300, that supports IUC for beamformed communications in accordance with one or more aspects of the present disclosure. For example, the wireless communications system 300 may support communications between a UE 115-c, a UE 115-d, a UE 115-e, and a UE 115-f, which may be examples of UEs 115 described with reference to FIGS. 1 and 2. For instance, the UE 115-c may be an example of a UE-A, and the UE 115-d, the UE 115-c, and the UE 115-d may be examples of a UE-B.

Resource conflict indications 315-a, 315-b, and 315-c may be examples of the resource conflict indication 215 as described with reference to FIG. 2. Resource reservations 310-a, 310-b, and 310-c may be examples of the resource reservation 210 as described with reference to FIG. 2. The UEs may communicate via the sidelinks 320-a, 320-b, or 320-c.

In some examples, such as with communications supporting Scheme 2 IUC, the UE 115-c may determine one of two possible UEs to transmit the resource conflict indication 315 by priority order. For example, the reservation of a UE may be assigned a priority value (e.g., from 0 to 7) where a lower priority value (e.g., 0) is associated with a higher priority reservation or transmission and a higher priority value (e.g., 7) may be associated with a lower priority reservation or transmission. For example, the UE 115-c may receive resource reservation 310-a from the UE 115-d and the resource reservation 310-b from the UE 115-e. The UE 115-c may determine the resource reservations 310-a and 310-b are in conflict for future transmissions of data. The UE 115-c may determine to transmit the resource conflict indication 315 (e.g., such as an IUC indication), to the UE with reservation with lower priority (e.g., higher priority value). For example, if the UE 115-d has a priority value of 0, and the UE 115-e has a priority value of 7, the UE 115-c may determine to transmit the resource conflict indication 315-b to the UE 115-e (in this example, the UE 115-e may be the receiving UE). If the reservation of UE 115-d has a priority value of 7 and the reservation of the UE 115-e has a priority value of 0, the UE 115-c may transmit the resource conflict indication 315-a to the UE 115-d. The UE 115-d may reselect resources according to the resource conflict indication 315-a. In some examples, one of the transmitting UEs (e.g., the UE 115-d, the UE 115-e, and the UE 115-f) may be an interfering UE.

In some other examples, the UE 115-c may determine one of three or more possible UEs to transmit the resource conflict indication 315 by priority order. For example, the UE 115-c may receive resource reservation 310-a from the UE 115-d, the resource reservation 310-b from the UE 115-c, and the resource reservation 310-c from the UE 115-f. The UE 115-c may determine the resource reservations 310 are in conflict. The UE 115-c may determine to transmit the resource conflict indication 315 (e.g., the IUC indication) to one or more of the UEs 115 having reservations of lower priority (e.g., higher priority value). For example, if the reservation of UE 115-d has a priority value of 4, the reservation of UE 115-e has a priority value of 0, and the reservation of UE 115-f has a priority value of 7, the UE 115-c may determine to transmit the resource conflict indication 315-a to the UE 115-d and the resource conflict indication 315-c to the UE 115-f. The UE 115-d and the UE 115-f may reselect resources according to the resource conflict indication 315-a and the resource conflict indication 315-c, respectively.

In some examples, the UE 115-d, the UE 115-e, and the UE 115-d may not transmit the resource reservation 310 to the UE 115-c. However, UE 115-c may still detect interference and transmit the resource conflict indication 315.

Figure 3B:
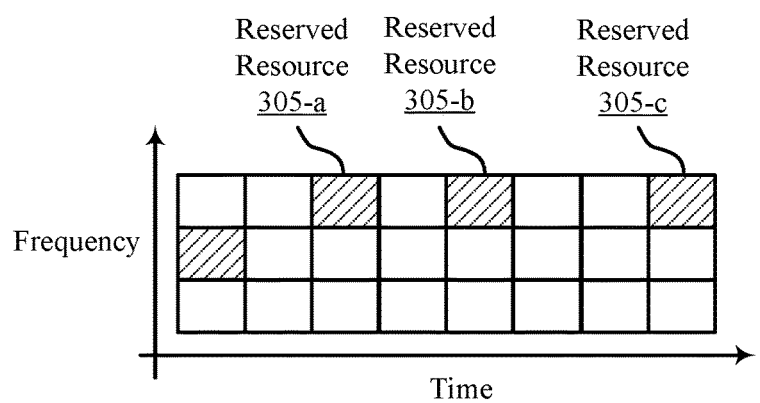

FIG. 3B illustrates an example of a grid resource diagram 301 that supports IUC for beamformed communications in accordance with one or more aspects of the present disclosure. For example, the grid resource diagram 301 illustrates the resource reservations 310 as described with reference to FIG. 3A. A reserved resource 305-*a*, a reserved resource 305-*b*, and a reserved resource 305-*c* may be examples of resources reserved by one or more UEs, which may be examples of UE 115 as described with reference to FIGS. 1 through 3A. In some examples, the resources may be reserved by the UE 115-*d*, the UE 115-*e*, and the UE 115-*f* as described with reference to FIG. 3A.

In some examples, the UEs as described in further detail with reference to FIG. 3A, may reserve one or more resources that may interfere or otherwise overlap with one another. For example, two UEs may reserve the same resource, where at least one of the UEs transmits to the UE 115-*c* as described with reference to FIG. 3A. The UE 115-*c* may or may not be the destination UE of the resource reservation indication.

In some examples, the UE 115-*c* may not be the destination UE associated with the resource reservation for the reserved resources. However, the capability for a non-destination UE to transmit IUC conflict indication may be enabled (e.g., typeAUEScheme2 is enabled). Thus, if the UE 115-*c* is not the destination UE, the UE 115-*c* may still transmit IUC conflict indication to another UE that reserved a conflicting resource to transmit to a different UE. In some examples, such as if typeAUEScheme2 is enabled, the UE 115-*c* may transmit the resource conflict indication 315 to any of the UEs 115 reserving a conflicting resource (e.g., reserved resource 305), regardless of whether the UE 115-*c* is the destination UE for the resource reservation 310. For example, the UE 115-*e* as further described with reference to FIG. 3A, may reserve one or more resources, including reserved resource 305-*a* and reserved resource 305-*b*. The UE 115-*d* as further described with reference to FIG. 3A may reserve the reserved resource 305-*b*, and the UE 115-*f* may reserve the reserved resource 305-*b*. The UE 115-*a* may receive the resource reservations, and the UE 115-*a* may determine a resource reservation conflict. If the resource reservation associated with UE 115-*e* has the highest priority (lowest priority value) the UE 115-*c* may transmit the conflict indication to the UE 115-*d* to switch from reserved resource 305-*a* to another resource, and the UE 115-*c* may transmit the conflict indication to the UE 115-*f* to switch from the reserved resource 305-*b* to another resource. The UE 115-*e* may then transmit communications using the reserved resource 305-*a* and the reserved resource 305-*b*.

The UE 115-*a* may determine one or more UEs 115 to transmit a conflict indication for each reserved resource 305-*a*. For example, if the UE 115-*d* and the UE 115-*f* both reserve the reserved resource 305-*a*, the UE 115-*d* may transmit the conflict indication to the UE 115 having the lowest priority. If the UE 115-*d* and the UE 115-*e* both reserve the reserved resource 305-*b*, the UE 115-*d* may transmit the conflict indication to the UE 115 with the lowest priority. The UE 115 that transmits using the reserved resource may be the same or may not be the same for the reserved resource 305-*a* and the reserved resource 305-*b*.

In some examples, the UE 115-*c* may be the destination UE 115 of the resource reservation indication, or the UE 115-*c* may not be the non-destination UE 115. The function of the UE 115-*c* to be the destination UE may be disabled (e.g., typeAUEScheme2 is disabled). In some examples, such as if typeAUEScheme2 is disabled, the UE 115-*c* may transmit the conflict indication 315 to the UE using the conflicting resource (e.g., reserved resource 305) to transmit to the UE 115-*c*. For example, the UE 115-*d* may have a priority value of 4, the UE 115-*e* may have a priority value of 0, and the UE 115-*f* may a priority value of 3. The reserved resource 305-*a* may be reserved by the UE 115-*e* and the UE 115-*d*. For the conflict of the reserved resource 305-*a*, the UE 115-*c* may determine to transmit the conflict indication to the UE 115-*d*, due to lower priority value (higher priority) of the resource reservation associated with UE 115-*e*. The reserved resource 305-*b* may be reserved by the UE 115-*d* and the UE 115-*f*. For the conflict of the reserved resource 305-*b*, the UE 115-*f* may have the lower priority and may thus receive the conflict indication. However, if the destination UE corresponding to the reserved resource 305-*b* reserved by UE 115-*f* is not the UE 115-*c*, and the non-destination UE functioning as the destination UE is disabled, the UE 115-*c* may not be able to transmit the conflict indication. The reserved resource 305-*c* may be reserved by the UE 115-*e* and the UE 115-*f*. The UE 115-*c* may be the destination for the transmission of UE 115-*e* corresponding to the reserved resource 305-*c*, but not the destination for the transmission of UE 115-*f* corresponding to the reserved resource 305-*c*. The UE 115-*c* may not transmit the conflict indication to the UE 115-*f* of lower priority because the UE 115-*c* is not the destination UE for UE 115-*f*, and the capability for the UE 115-*c* to function as a destination UE when not the destination UE is disabled.

The UE 115-*c* may determine expected or potential conflicts of reserved resources 305-*a*, 305-*b*, and 305-*c* based on at least one or more conditions. First, there may be a reserved resource conflict if one or more reserved resources partially or fully overlap with the one or more resources of another UE (e.g., indicated by SCI) in time and frequency. Conflict reservations may occur when a 'non-destination UE functioning as the destination UE' (e.g., typeAUEScheme2) is enabled, or when the destination UE is the UE 115-*c* and the 'non-destination UE functioning as the destination UE' (e.g., typeAUEScheme2) is disabled.

In some examples, for each pair of UEs scheduling the conflicting reserved resources whose PSFCH occasions for resource conflict indication have not occurred, the indicationUEB flag may be set to 1 if the higher parameter of indicationUEBScheme2 is (pre)configured to 'enabled.' In such examples, a UE with the higher priority value (lower priority resource reservation) may be designated as the UE-B, or the UE to receive the resource conflict indication. When the UEs in the pair have the same priority value, the UE-A, or the UE transmitting the resource conflict indication, may determine one of the UEs to receive the resource conflict indication by UE implementation.

The UE-A (e.g., the UE 115-*c*) may include the SCIs received earlier than or equal to a threshold time duration (e.g., sl-MinTimeGapPSFCH) before the PSFCH occasion for conflict indication when determining which UE to is to receive the resource conflict indication (e.g., to be the UE-B). For example, if the sl-MinTimeGapPSFCH criteria, or threshold, is not satisfied for the UE 115-*f*, the UE 115-*c* may not transmit the resource conflict indication 315-*c*. However, there may still be a conflict between resource reservations. In some examples, the time between the PSFCH occasion and the reserved resource may be 3, 5, 9, 18 logical slots for SCS 15, 30, 60, and 120 kHz, respectively.

Thus, in one example of resource conflict, for each conflicted resource, the UE 115-*c* (e.g., the UE-A) determines a set of potential UE-Bs (UEs whose transmissions would overlap in the conflicted resource). The UE 115-*c* chooses one UE to be UE-B from the set of potential UE-Bs based on priority. If a non-destination UE functioning as the destination UE (e.g., typeAUEScheme2) is disabled, the set of potential UE-Bs may include target transmitters of the UE 115-c. In some other examples, the set of potential UE-Bs include all nearby transmitting UEs and target transmitters of the UE 115-c.

Further, the UE 115-c may determine a resource conflict of overlapping resources based on an RSRP threshold. The threshold may depend on the priority of the UEs (e.g., priority of UE-B and of other UEs). In some examples, the UE 115-c is the destination UE for the other UEs. For example, the UE 115-d and the UE 115-e may both reserve the resource 305-a. The UE 115-c may determine that there is a conflict for the reserved resource 305-a if the RSRP of the UE 115-e is greater than an RSRP threshold. The UE 115-c may then transmit a conflict indication to the UE 115-d. In some other examples, the UE 115-d and the UE 115-f may reserve the reserved resource 305-c. The UE 115-c may determine there is a conflict for the reserved resource 305-c if the RSRP of the UE 115-f is greater than an RSRP threshold. In such cases, the UE 115-c may transmit the conflict indication to the UE 115-f.

In a second example of resource conflict, one or more resources (e.g., one or more slots) may be reserved by the transmitting UE. The UE 115-c (e.g., the UE-A) may be configured with half duplex operation, and thus not able to perform sidelink reception concurrently with sidelink transmission. In such examples, such as if the UE 115-c is the destination UE of the transmitting UE (e.g., UE-B), there may be a resource conflict.

In some examples, a UE may transmit conflict indication messages (or may otherwise indicate sidelink resource conflicts) via the PSFCH. For example, PSFCH format 0 from the UE 115-c may be used to indicate expected or potential resource conflict on one or more reserved resources indicated by the SCI of the transmitting UE. For allocating PSFCH resources in Scheme 2, at least sl-PSFCH-Conflict-RB-Set for conflict indication may be pre-configured separately from the sl-PSFCH-RB-Set for sidelink HARQ-ACK feedback. In some examples, the UE 115-c may be configured with different physical resource blocks that may be pre-configured to use for transmitting conflict indications, HARQ-ACK information, or both. The index of a PSFCH resource for IUC information transmission may be determined according to various methods and parameters. For example, the layer 1 source identifier (e.g., P_ID) may be indicated by the SCI of the transmitting SCI. Further, M_ID may be set to 0, the m CS may be set to 0 for a resource conflict indication for the next reserved resource indicated by the SCI of the transmitting UE for either current or next resource (e.g., transport block) transmission, and the m_0 for a resource conflict indication may derived in the same way as specified for HARQ-ACK information.

To address the identified resource conflict, the UE 115-c may relocate the intended transmission to avoid interference, relocate the interfering transmission to prevent interference, or relocate one transmission to prevent collision. For example, if the UE 115-c is the destination UE of the resource reservation 310-a of the UE 115-d, and the UE 115-c transmits the resource reservation 310-b having a higher priority than the UE 115-d, the UE 115-c may relocate the resource reservation 310-a (e.g., the intended transmission of the UE 115-d). If the UE 115-c is not the destination UE of the resource reservation 310-a of the UE 115-d, and the UE 115-c is the destination UE of the resource reservation 310-b of the UE 115-e, and the UE 115-e has a higher priority than the UE 115-d, the UE 115-c may relocate the interfering resource reservation 310-a (e.g., the interfering transmission of the UE 115-d). If the UE 115-c is the destination UE of the resource reservation 310-a of the UE 115-d and is the destination UE of the resource reservation 310-b of the UE 115-e, and the UE 115-e has a higher priority than the UE 115-d, the UE 115-c may relocate the interfering resource reservation 310-a (e.g., relocating one transmission to prevent collision). In some examples, if the RSRP of the UE 115-d is greater than the RSRP threshold, than the UE 115-d may disrupt the reception for the resource reservation 310-b, despite the higher priority of the resource reservation 310-b.

Figure 4:
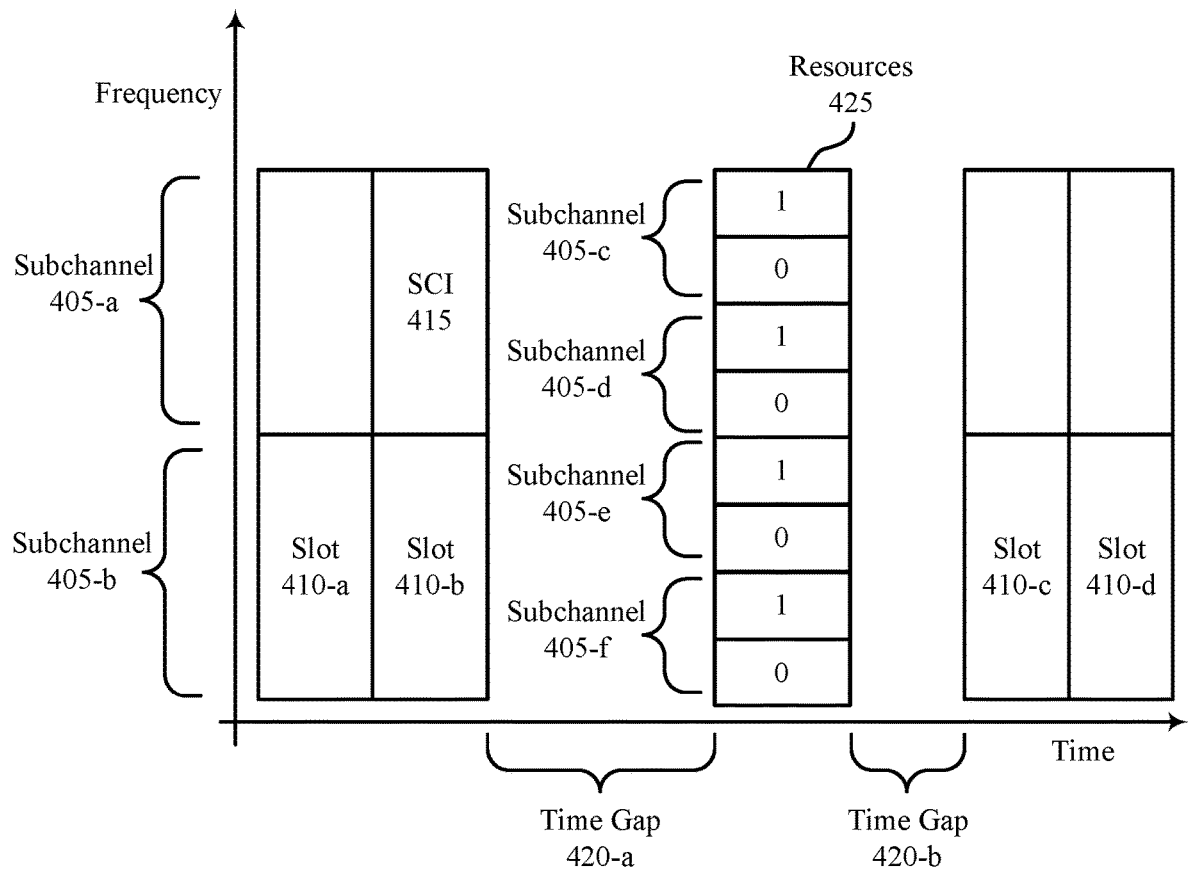
FIG. 4 illustrates an example of a time resource diagram that supports IUC for beamformed communications in accordance with one or more aspects of the present disclosure.

FIG. 4 illustrates an example of a time resource diagram 400 that supports IUC for beamformed communications in accordance with one or more aspects of the present disclosure. For example, the time resource diagram 400 describes the PSFCH occasion for conflict indication as described with reference to FIG. 3B. The horizontal axis of time resource diagram 400 indicates time, and the vertical axis of time resource diagram 400 indicates frequency. The frequency is split into subchannel 405-a and subchannel 405-b, and further divided into additional subchannels. Along the time axis, slots may occur in different periods of time. Two options may be described with reference to FIG. 4. The slot 410-a and the slot 410-b may depict the first option, where a PSFCH occasion is derived by a slot where the resource reservation as a part of SCI is transmitted. The slot 410-c and the slot 410-d may depict the second option, where the PSFCH occasion is derived by a slot where expected or potential resource conflict occurs on the PSSCH resource indicated by the resource reservation as part of the SCI. A resource pool-level pre-configuration may use one of two options to determine the resource for the PSFCH transmission for conflict indication.

A first option (e.g., option 1) may include examples in which a PSFCH occasion is derived by a slot where UE B transmits SCI. In some examples, neither options may be configured. Two slots may be associated with the PSFCH slot of option 1: slot 410-a and slot 410-b. The SCI 415 may be SCI information from UE-B, and SCI 415 may be in the subchannel 405-a and the slot 410-b. The SCI 415 may reserve the resources for slot 410-c, creating a resource conflict.

Option 1 may be followed by a time gap 420-a, followed by resources 425. The resources 425 may be split into subchannels, and each subchannel may include a resource 0 and a resource 1. The UE-A may identify one or more of the resources 425 to indicate conflict for option 1. For examples, the UE-A may reserve the first resources of each subchannel 405-a and the first resource of subchannel 405-b. The UE-A may reserve the resource 1 of the subchannel 405-c, and the resource 1 of the subchannel 405-e.

Option 1 may include PSSCH-to-PSFCH timing to determine the PSFCH occasion for resource conflict indication. The time gap 420-b between the PSFCH and a slot where expected or potential resource conflict occurs is larger than or equal to a threshold. If there is a PSFCH occasion satisfying the minimum time gap 420-a (sl-MinTimeGapPSFCH) between the PSFCH occasion and a slot where the SCI is transmitted, but not does not satisfy the minimum time gap 420-b between the PSFCH occasion and a slot of the earliest reserved PSSCH resource indicated by the corresponding SCI after the PSFCH occasion, the PSFCH occasion cannot be used by the receiving UE (e.g., the UE A) for a conflict indication for reserved PSSCH resource other than the earliest reserved PSSCH resource indicated by the corresponding SCI after the PSFCH occasion.

Following the resources 425 may be a time gap 420-b, followed by a second option (e.g., option 2). Option 2 may describe when the PSFCH occasion is derived by a slot where expected or potential resource conflict occurs on the PSSCH resource indicated by the transmitting UE (e.g., the UE-B), including the SCI, and may include the slot 410-*c* and the slot 410-*d*. The UE-A may one or more of the resources 425 to indicate conflict for option 2. For example, the UE-A may reserve the last resource of each subchannel, such as the last resource of subchannel 405-*a* and the last resource of subchannel 405-*b*. The UE-A may reserve the resource 0 of the subchannel 405-*d*, and the resource 0 of the subchannel 405-*f* In some examples, the sl-PSFCH-Period is equal to 2, that may indicate there are two subchannels in the resource pool.

A resource pool-level configuration (or preconfiguration) may in some cases implement option 2 for resource conflict indication. In some examples, the UE-A may transmit the PSFCH in a latest slot that includes PSFCH resources for IUC information and is at least the time gap 420-*a* of the resource pool before the PSSCH resource indicated by SCI transmitted by UE B in which expected or potential resource conflict occurs. The time gap 420-*a* between the PSFCH and SCI(s) scheduling conflicting resources 425 is larger than or equal to sl-MinTimeGapPSFCH. The UE does not transmit the conflict indicator or receive the conflict indicator if the timeline is not satisfied.

In some cases, the time resource diagram 400 may allow a UE to determine whether resource conflicts exist for a quantity of available or scheduled resources. Additionally or alternatively, the UE may detect potential resource conflicts and send resource conflict indications based on various beamforming implementations combined with known resource reservations. For example, in some cases, the UE may determine whether a conflict indication exists for the resource reservation based on different beams that the UE uses to receive the resource reservation, based on whether the UE is an intended recipient of the transmission associated with the resource reservation, or both.

Figure 5A:
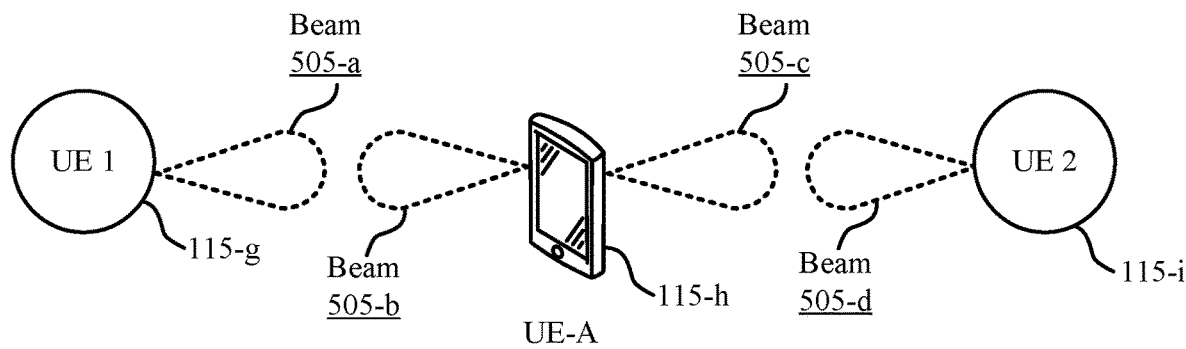
FIGS. 5A and 5B illustrate examples of wireless communications systems and FIG. 5C illustrates an example of a grid resource diagram, each of which support IUC for beamformed communications in accordance with one or more aspects of the present disclosure.

FIG. 5A illustrates an example of a wireless communications system 500 that supports IUC for beamformed communications in accordance with one or more aspects of the present disclosure. For example, the wireless communications system 500 describes beamformed communication between UE 115-*g*, UE 115-*h*, and UE 115-*i* (e.g., UE A, UE 1, and UE 2) each of which may be examples of UEs described herein.

A UE 115-*g* (e.g., UE 1) may be an example of the UE-B as described with reference to FIG. 1, UE 115-*h* may be an example of the UE-A as described with reference to FIG. 1, and UE 115-*i* (e.g., UE 2) may be an example of the UE-C (e.g., UE 2) as described with reference to FIG. 1. The UE 115-*g* and the UE 115-*i* may both be examples of a potential UE-B as described with reference to IUC applications. The UE 115-*g* may transmit the beam 505-*a*, the UE 115-*h* may transmit the beam 505-*b* and beam 505-*c*, and the UE 115-*i* may transmit the beam 505-*d*.

In a first example, the UE 115-*h* may not be the destination UE for the resource reservation of UE 115-*g*. The UE 115-*h* may be the intended destination UE for the resource reservation of UE 115-*i*. The UE 115-*h* may receive the resource reservation (e.g., SCI) from the UE 115-*g* using the beam 505-*b*, and may receive the resource reservation from the UE 115-*i* using the beam 505-*c*. Thus, if the UE 115-*g* and the UE 115-*i* both reserve the same resource (e.g., reserved resource 510-*a*, which overlaps in time and frequency as described with reference to FIG. 5C), UE 115-*h* does not have a resource conflict because the UE 115-*h* will not receive from UE 115-*g*. Additionally or alternatively, since the UE 115-*h* may not be the destination UE for the UE 115-*g*, the UE 115-*h* may receive only communications on the reserved resource from UE 115-*i*, while the UE 115-*g* uses the reserved resource to transmit to a different UE.

In a second example, the UE 115-*h* may be the intended destination UE for both the UE 115-*g* and the UE 115-*i*. As described by FIG. 5C, the UE 115-*g* may reserve the reserved resource 510-*a*, and the UE 115-*i* may reserve the resource 510-*b*. The reserved resources may overlap in time but may not overlap in frequency. The UE 115-*h* may use the beam 505-*b* to receive the resource reservation from the UE 115-*g*, and use the beam 505-*c* to receive the resource reservation from the UE 115-*i*. The beam 505-*c* and the beam 505-*b* which the UE 115-*h* uses to receive the resource reservations may not overlap substantially. In such examples, the UE 115-*h* determines that there is a resource conflict because the UE 115-*h* may not be able to use the two different beams simultaneously. Then based on this determined resource conflict, the UE 115-*h* may transmit the conflict indication to UE 115-*g* or UE 115-*i* (e.g., the UE with the higher priority value).

Figure 5B:
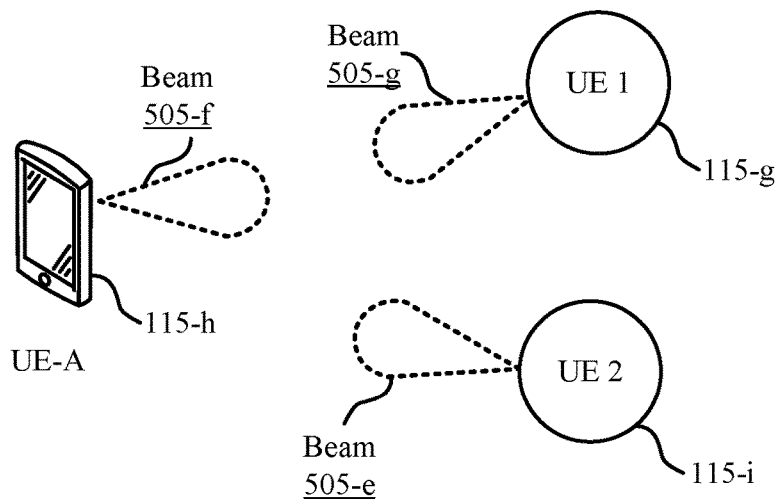

FIG. 5B illustrates an example of a wireless communications system 501 that supports IUC for beamformed communications in accordance with one or more aspects of the present disclosure. For example, the wireless communications system 501 describes beamformed communication between UE 115-*g*, UE 115-*h*, and UE 115-*i* (e.g., UE A, UE 1, and UE 2) each of which may be examples of UEs described herein.

UE 115-*g* may be an example of the UE-B as described with reference to FIG. 3, a UE 115-*h* may be an example of the UE-A as described with reference to FIG. 3, and a UE 115-*i* may be an example of the UE-C as described with reference to FIG. 3. The UE 115-*g* may transmit the beam 505-*g*, the UE 115-*h* may transmit the beam 505-*f*, and the UE 115-*i* may transmit the beam 505-*e*. In some examples, the UE 1 and the UE 2 may be examples of receiving UEs. The UE 1 and the UE 2 may both be examples of a potential UE-B as described with reference to IUC applications.

In this example, the UE 115-*g* and the UE 115-*i* reserve the same resource (e.g., reserved resource 510-*a* or resource 510-*c* as described with reference to FIG. 5C), and the UE 115-*h* may be the destination UE for the UE 115-*g*. The UE 115-*h* may use the beam 505-*f* to receive the resource reservations from the UE 115-*g* and the UE 115-*i*. In this example, the UE 115-*h* has a resource conflict since the UE 115-*h* may not be able to receive communications on the same reserved resource using the single beam 505-*f*.

Figure 5C:
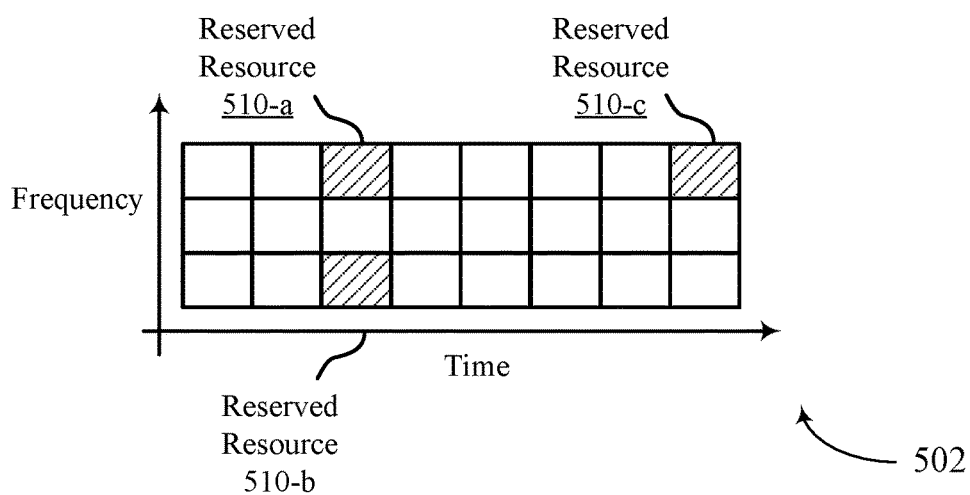

FIG. 5C illustrates an example of a block resource diagram 502 that supports IUC for beamformed communications in accordance with one or more aspects of the present disclosure. The block resource diagram 502 may illustrate various resources reserved by the UE 115-*h*, the UE 115-*g*, and the UE 115-*i* as described with reference to FIG. 5A and FIG. 5B.

For example, the UE 115-*g* and the UE 115-*i* may both reserve the resource 510-*a*. If the UE 115-*h* has two beams available, and the UE 115-*h* is the destination UE for one of the UEs, there is not a resource conflict. If the UE 115-*h* has two beams, one UE reserves reserved resource 510-*a* and one UE reserves resource 510-*b*, and the UE 115-*h* is the destination for both UEs, there is a resource conflict. If the UE 115-*g* and the UE 115-*i* both reserve the reserved resource 510-*a*, the UE 115-*h* has one beams, and is the destination UE for one of the UEs, there is a resource conflict.

Figure 6A:
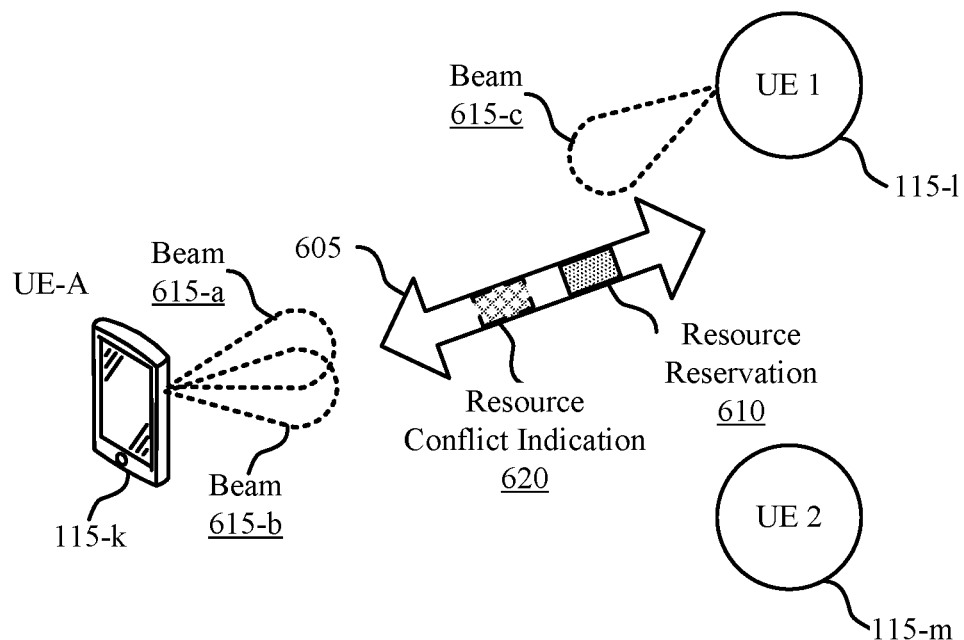
FIG. 6A and FIG. 6B illustrate examples of wireless communications systems that support IUC for beamformed communications in accordance with one or more aspects of the present disclosure.

FIG. 6A illustrates an example of a wireless communications system 600 that supports IUC for beamformed communications in accordance with one or more aspects of the present disclosure. The wireless communications system 600 describes the communication of resource reservation 610 and a resource conflict indication 620 between multiple UEs. For example, wireless communications system may illustrate communications between a UE 115-*k*, UE 115-1, and UE 115-*m*, which may be examples of UEs 115 described herein.

A UE 115-*k* may be an example of the UE-A as described with reference to FIG. 1, a UE 115-1 (e.g., UE 1) may be an example of the UE-B as described with reference to FIG. 3 and a UE 115-*m* (e.g., UE 2) may be an example of the UE-C as described with reference to FIG. 3. The UE 1 and the UE 2 may both be examples of a potential UE-B as described with reference to IUC applications. The UE 115-*k* may transmits beams 615-*a* and 615-*b*, which may be at least partially overlapping, the UE 115-1 may transmit a beam 615-*c*.

The UE 115-*k* may receive a resource reservation 610 via SCI from the UE 115-1 using beam 615-*a* and a resource reservation via SCI from the UE 115-*m* using the beam 615-*b*. For example, the UE 115-1 and the UE 115-*m* may reserve the reserved resource 510-*a* as described with reference to FIG. 5C. The beam 615-*a* and the beam 615-*b* may overlap in spatial coverage. In some examples, the beam 615-*a* and the beam 615-*b* may overlap substantially, such as if the beams are directed in similar directions and the main lobes overlap. If there is substantial overlap (e.g., greater than a threshold overlap), the UE 115-*k* may determine there is a resource conflict, and the UE 115-*k* may transmit a conflict indication to the UE 115 with the higher priority value (e.g., the lowest priority reservation).

The UE 115-*k* may use the beam used to receive the resource reservation to also transmit the conflict indication. For example, if the UE 115-*k* receives the resource reservation 610 from the UE 115-1 using the beam 615-*a*, the UE 115-*k* may use the beam 615-*a* to transmit the resource conflict indication 620. If the UE 115-1 uses the beam 615-*c* to transmit the resource reservation 610, the UE 115-1 may use the beam 615-*c* to receive the resource conflict indication 620.

Figure 6B:
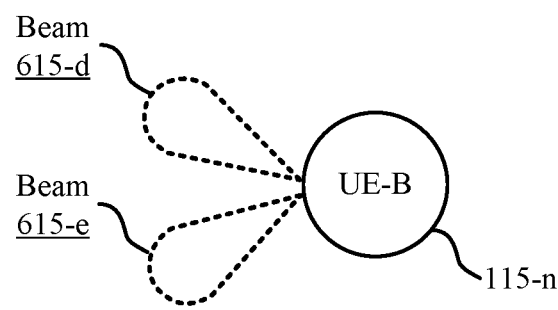

FIG. 6B illustrates an example of a wireless communications system 601 that support IUC for beamformed communications in accordance with one or more aspects of the present disclosure. For example, the wireless communications system 601 describes communications associated with a UE 115-*n* and associated beams, which may be an example of the UE-B as described with reference to FIG. 1.

In some examples, a PSFCH conflict indication occasion maps to multiple reservations transmitted by the UE 115-*n* on multiple beams via a PSFCH 605. For example, the UE 115-*n* may reserve resources that overlap in time, but may be different in frequency, or the UE 115-*n* may reserve the same resource for a later transmission to a second UE. In some examples, the UE 115-*n* may not be able to receive simultaneously on multiple beams. For example, the UE 115-*n* may not be able to receive on the beam 615-*d* and the beam 615-*e* simultaneously. In some cases, however, the second UE may transmit a conflict indication to the UE 115-*n* to notify the UE 115-*n* of a possible conflict. The UE 115-*n* may determine the reservation with the highest priority value and use the beam corresponding to the highest priority value reservation (e.g., lowest priority reservation) to receive the conflict indication for that beam.

Figure 7:
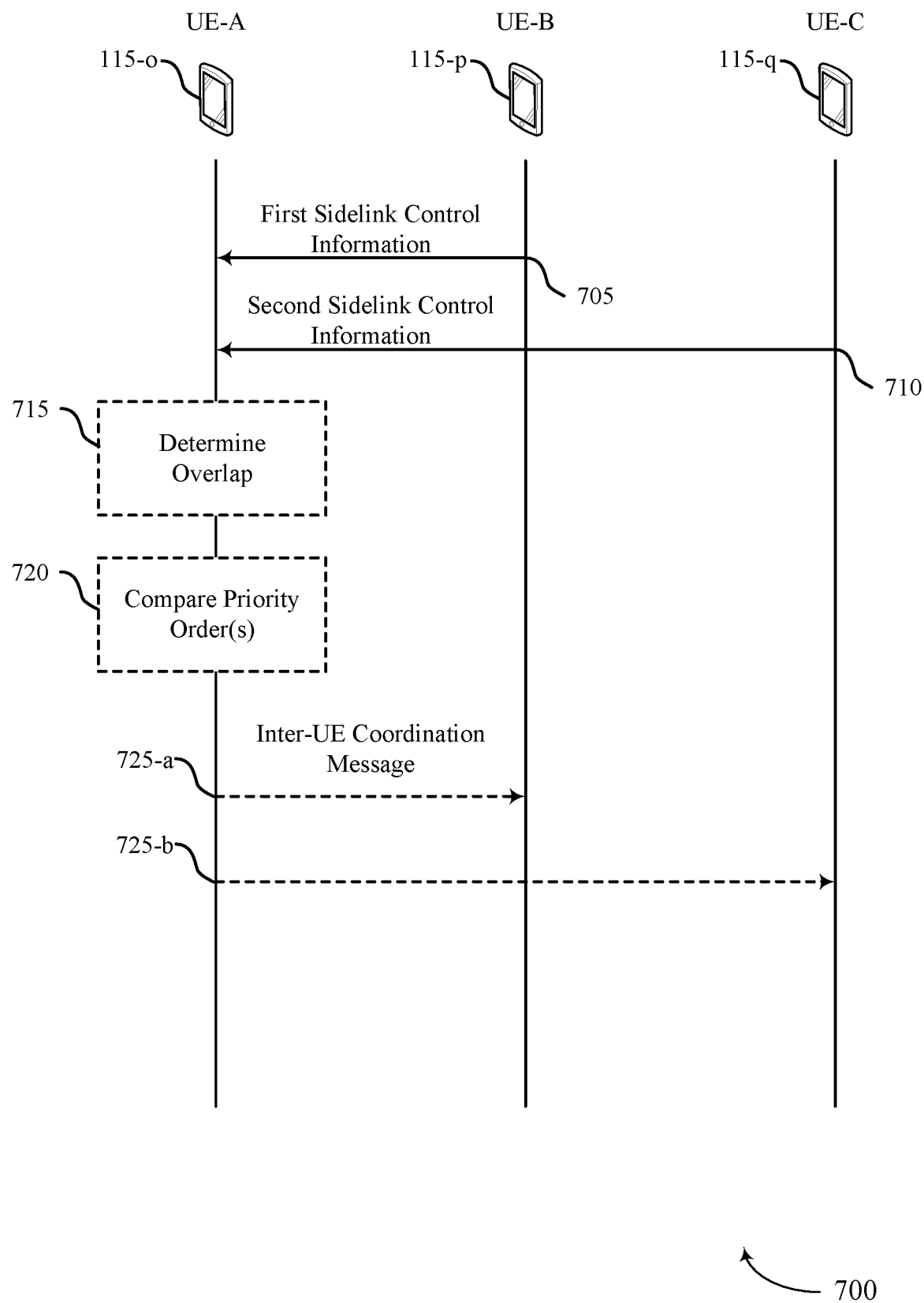
FIG. 7 illustrates an example of a process flow that supports IUC for beamformed communications in accordance with one or more aspects of the present disclosure.

FIG. 7 illustrates an example of a process flow 700 that supports IUC for beamformed communications in accordance with one or more aspects of the present disclosure. The process flow 700 describes the communications of IUC between UE 115-*o*, UE 115-*p*, and UE 115-*q*, each of which may be an example of a UE 115 as described herein. Alternative examples of the following process flow may be implemented, where some steps are performed in a different order than described or are not performed at all. In some cases, steps may include additional features not mentioned below, or further steps may be added.

The UE 115-*o* may be an example of the UE-A as described with reference to FIG. 1, the UE 115-*p* may be an example of the UE-B as described with reference to FIG. 1, and the UE 115-*q* may be an example of a UE-C.

At 705, the UE 115-*p* may transmit a first SCI message to the UE 115-*o*. The UE 115-*o* may be a first UE, and the UE 115-*p* may be a second UE. The first UE may receive, using a first spatial filter (e.g., corresponding to a first beam), a first sidelink control message including a first sidelink resource reservation associated with a second UE. The first sidelink resource reservation may indicate a first sidelink resource reserved by the second UE for transmission to the first UE.

At 710, the UE 115-*q* may transmit a second SCI message to the UE 115-0. The UE 115-*q* may be a third UE. The UE 115-*o* may receive, using a second spatial filter (e.g., corresponding to a second beam), a second sidelink control message including a second sidelink resource reservation associated with a third UE. The second sidelink resource reservation may indicate a second sidelink resource reserved by the third UE for transmission to a fourth UE or the first UE.

At 715, the UE 115-*o* may determine a resource reservation overlap. For example, the UE 115-*o* may determine that a first beam corresponding to the first spatial filter at least partially overlaps with a second beam corresponding to the second spatial filter. In some examples, the first sidelink resource reservation and the second sidelink resource reservation at least partially overlap in time and frequency. The first beam corresponding to the first spatial filter may at least partially overlap with the second beam corresponding to the second spatial filter based on a quasi-colocation (QCL) relationship between the first spatial filter and the second spatial filter.

The UE 115-*o* may determine that the first beam corresponding to the first spatial filter at least partially overlaps with the second beam corresponding to the second spatial filter. This may be determined by determining that a signal power for signaling received from the third UE using the first spatial filter satisfies a threshold, that a signal power for signaling received from the second UE using the second spatial filter satisfies the threshold, that the first spatial filter and the second spatial filter are identical, or that the first spatial filter and the second spatial filter have identical spatial receiver parameters. Overlap may be determined by determining that the first sidelink resource reservation and the second sidelink resource reservation at least partially overlap in time, where transmitting, to the second UE or to the third UE, the IUC message that indicates the conflict between the first sidelink resource reservation and the second sidelink resource reservation is based on the first sidelink resource reservation and the second sidelink resource reservation at least partially overlapping in time.

At 720, the UE 115-*o* may compare one or more priorities associated with the conflicting resource reservations. For example, the UE 115-*o* may compare a first priority value of the first sidelink resource reservation associated with the second UE to a second priority value of the second sidelink resource reservation associated with the third UE, or the UE 115-*o* may compare a first priority value of the first sidelink resource reservation associated with the second UE to a second priority value of the second sidelink resource reservation associated with the third UE. The IUC message may be transmitted to the second UE based on the first priority value being greater than the second priority value.

At 725, the UE 115-*o* may transmit IUC messages. At 725-*a*, the UE 115-*o* may transmit an IUC message to the UE 115-*p*. At 725-*b*, the UE 115-*o* may transmit an IUC message to the UE 115-*q*. The UE 115-*o* may transmit, to the second UE (e.g., the UE 115-*p*) or to the third UE (e.g., the UE 115-*q*), an IUC message that indicates a conflict between the first sidelink resource reservation and the second sidelink resource reservation based on a relationship between the first spatial filter used to receive the first sidelink resource reservation and the second spatial filter used to receive the second sidelink resource reservation. The UE 115-*o* may transmit, to the second UE or the third UE, the IUC message that indicates the conflict between the first sidelink resource reservation and the second sidelink resource reservation is based on the first beam at least partially overlapping with the second beam. The IUC message may include a scheme-2 IUC message.

Additionally or alternatively, at 725-*a*, the IUC message may be transmitted to the second UE based on the first priority value being greater than the second priority value. The UE 115-*o* may transmit, to the second UE (e.g., the UE 115-*p*), the IUC message using the first spatial filter based at least in part on the first UE using the first spatial filter to receive the first sidelink control message.

At 725-*b*, the UE 115-*o* may transmit to the third UE, the IUC message using the second spatial filter based at least in part on the first UE using the second spatial filter to receive the second sidelink control message. In some examples, the UE 115-*o* refrain from transmitting a second IUC message that indicates a conflict between the third sidelink resource and the fourth sidelink resource based on the first beam being at least partially non-overlapping the second beam.

In some examples, the UE 115-*p*, or the second UE, may transmit, using the second spatial filter, a second sidelink control message that includes a third sidelink resource reservation, where the first sidelink resource reservation and the third sidelink resource reservation both map to an IUC message opportunity. The UE 115-*p* may then refrain from monitoring resources of the IUC message opportunity for a second IUC message associated with the third sidelink resource reservation. In such examples, the IUC message that indicates the conflict between the first sidelink resource reservation and the second sidelink resource reservation is received via the resources of the IUC message opportunity.

In some examples, a first beam corresponding to the first spatial filter and a second beam corresponding to the second spatial filter are spatially separated. The first spatial filter and the second spatial filter may have different spatial receiver parameters.

In some examples, the UE 115-*o*, (e.g., the first UE, UE-A) may receive, using a third spatial filter corresponding to a first beam, a third sidelink control message indicating a third sidelink resource reserved by a fourth UE for transmission to the first UE. The UE 115-*o* may receive, using a fourth spatial filter corresponding to a second beam, a fourth sidelink control message indicating a fourth sidelink resource reserved by a fifth UE for transmission to a sixth UE, wherein the fourth sidelink resource at least partially overlaps with the third sidelink resource in time and frequency. The UE 115-*o* may receive, using the first spatial filter, a first sidelink transmission from the fourth UE via the third sidelink resource.

Figure 8:
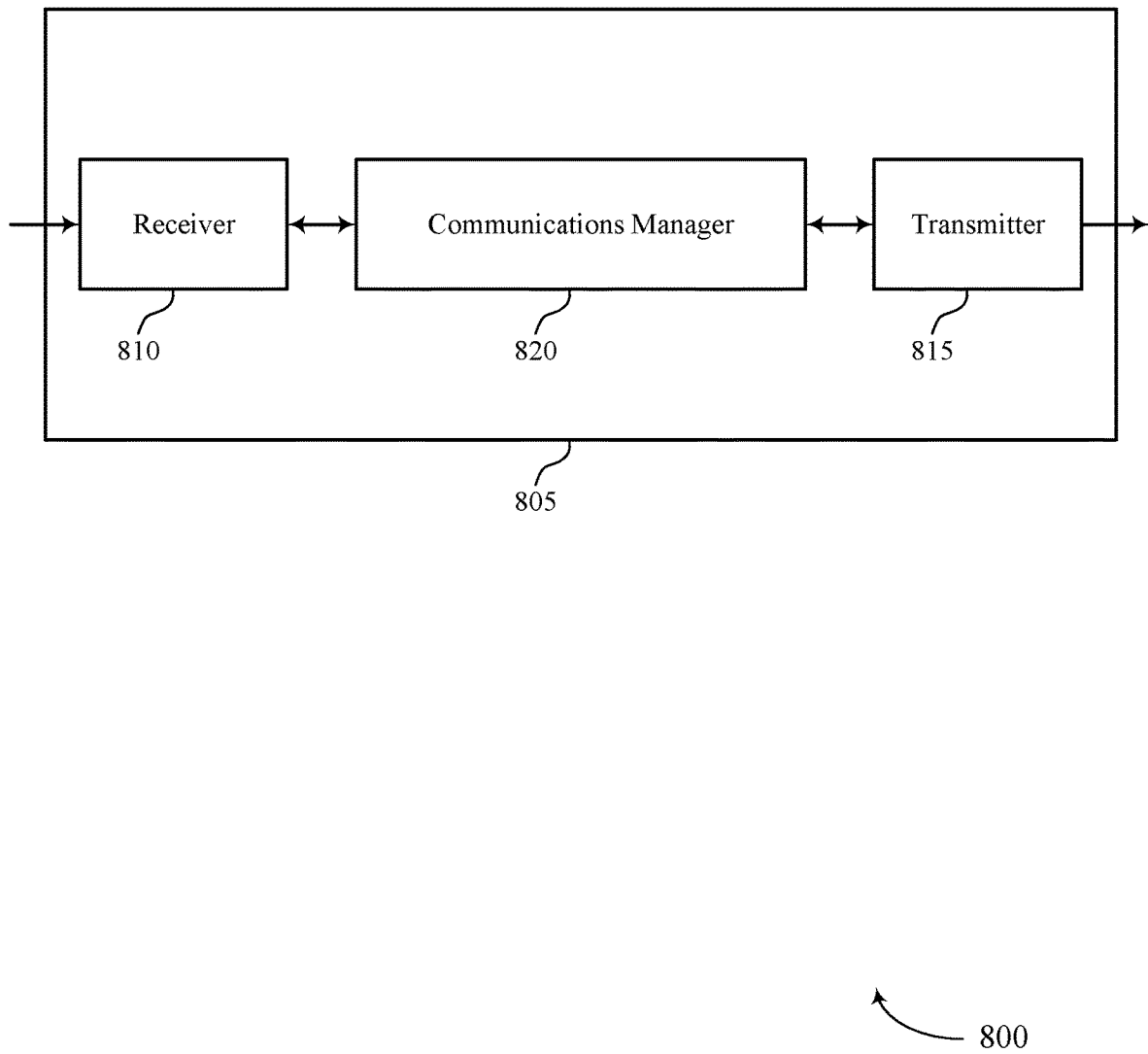
FIGS. 8 and 9 show block diagrams of devices that support IUC for beamformed communications in accordance with one or more aspects of the present disclosure.

FIG. 8 shows a block diagram 800 of a device 805 that supports inter-user equipment coordination for beamformed communications in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to inter-user equipment coordination for beamformed communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to inter-user equipment coordination for beamformed communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of inter-user equipment coordination for beamformed communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first UE in accordance with examples as disclosed herein. For example, the communications manager 820 may be configured as or otherwise support a means for receiving, using a first spatial filter, a first sidelink control message including a first sidelink resource reservation associated with a second UE. The communications manager 820 may be configured as or otherwise support a means for receiving, using a second spatial filter, a second sidelink control message including a second sidelink resource reservation associated with a third UE. The communications manager 820 may be configured as or otherwise support a means for transmitting, to the second UE or to the third UE, an IUC message that indicates a conflict between the first sidelink resource reservation and the second sidelink resource reservation based on a relationship between the first spatial filter used to receive the first sidelink resource reservation and the second spatial filter used to receive the second sidelink resource reservation.

Additionally, or alternatively, the communications manager 820 may support wireless communication at a second UE in accordance with examples as disclosed herein. For example, the communications manager 820 may be configured as or otherwise support a means for transmitting, using a first spatial filter, a first sidelink control message including a first sidelink resource reservation. The communications manager 820 may be configured as or otherwise support a means for receiving, using the first spatial filter, an IUC message from a first UE that indicates a conflict between the first sidelink resource reservation and a second sidelink resource reservation associated with a third UE, where the second UE uses the first spatial filter to receive the IUC message based on using the first spatial filter to transmit the first sidelink control message.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for inter-user equipment coordination (IUC) for beamformed communications, which may result in reduced processing, reduced power consumption, more efficient utilization of communication resources, among other results.

Figure 9:
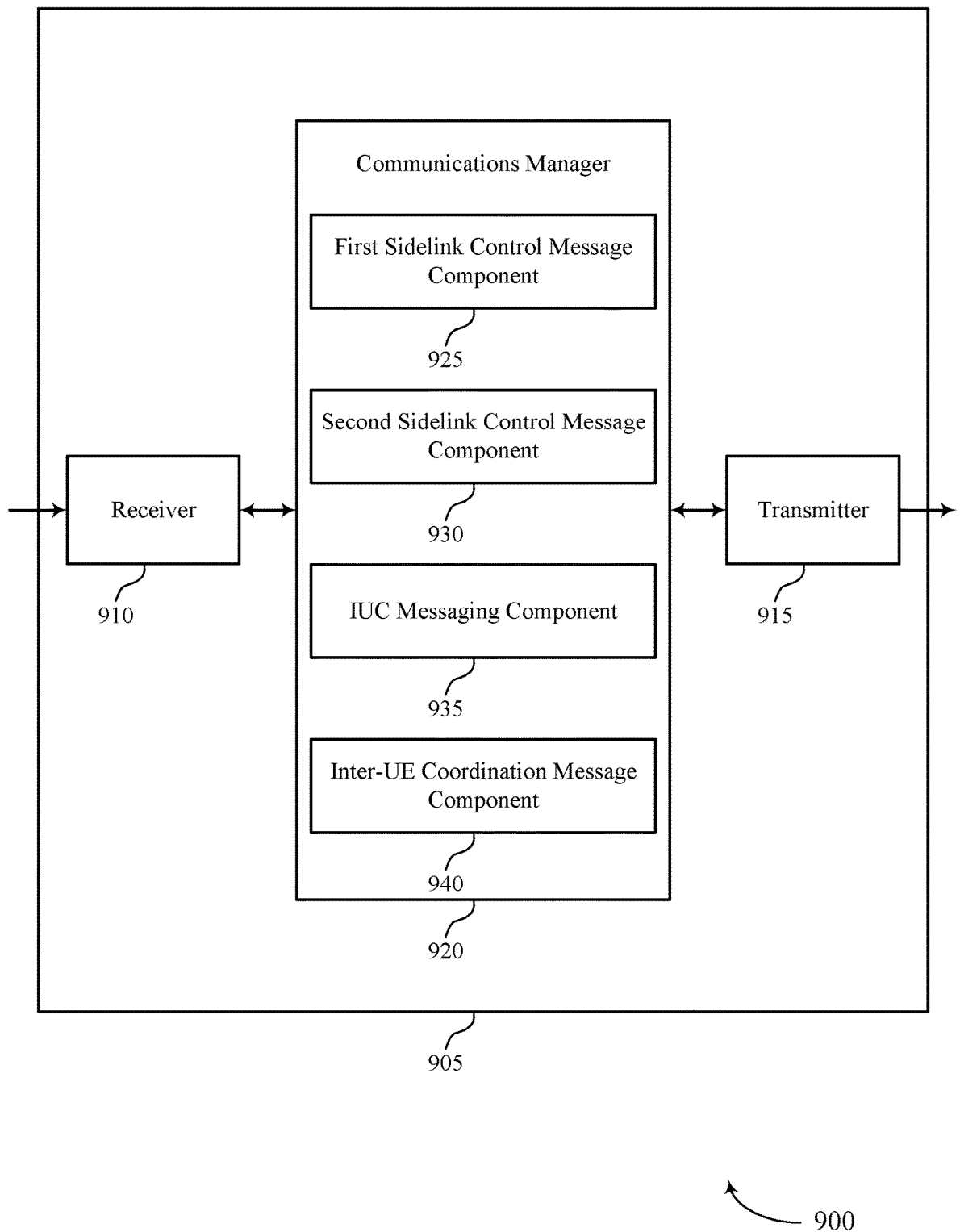

FIG. 9 shows a block diagram 900 of a device 905 that supports inter-user equipment coordination for beamformed communications in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to inter-user equipment coordination for beamformed communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to inter-user equipment coordination for beamformed communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of inter-user equipment coordination for beamformed communications as described herein. For example, the communications manager 920 may include a first sidelink control message component 925, a second sidelink control message component 930, an IUC messaging component 935, an IUC message component 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first UE in accordance with examples as disclosed herein. The first sidelink control message component 925 may be configured as or otherwise support a means for receiving, using a first spatial filter, a first sidelink control message including a first sidelink resource reservation associated with a second UE. The second sidelink control message component 930 may be configured as or otherwise support a means for receiving, using a second spatial filter, a second sidelink control message including a second sidelink resource reservation associated with a third UE. The IUC messaging component 935 may be configured as or otherwise support a means for transmitting, to the second UE or to the third UE, an IUC message that indicates a conflict between the first sidelink resource reservation and the second sidelink resource reservation based on a relationship between the first spatial filter used to receive the first sidelink resource reservation and the second spatial filter used to receive the second sidelink resource reservation.

Additionally, or alternatively, the communications manager 920 may support wireless communication at a second UE in accordance with examples as disclosed herein. The first sidelink control message component 925 may be configured as or otherwise support a means for transmitting, using a first spatial filter, a first sidelink control message including a first sidelink resource reservation. The IUC message component 940 may be configured as or otherwise support a means for receiving, using the first spatial filter, an IUC message from a first UE that indicates a conflict between the first sidelink resource reservation and a second sidelink resource reservation associated with a third UE, where the second UE uses the first spatial filter to receive the IUC message based on using the first spatial filter to transmit the first sidelink control message.

Figure 10:
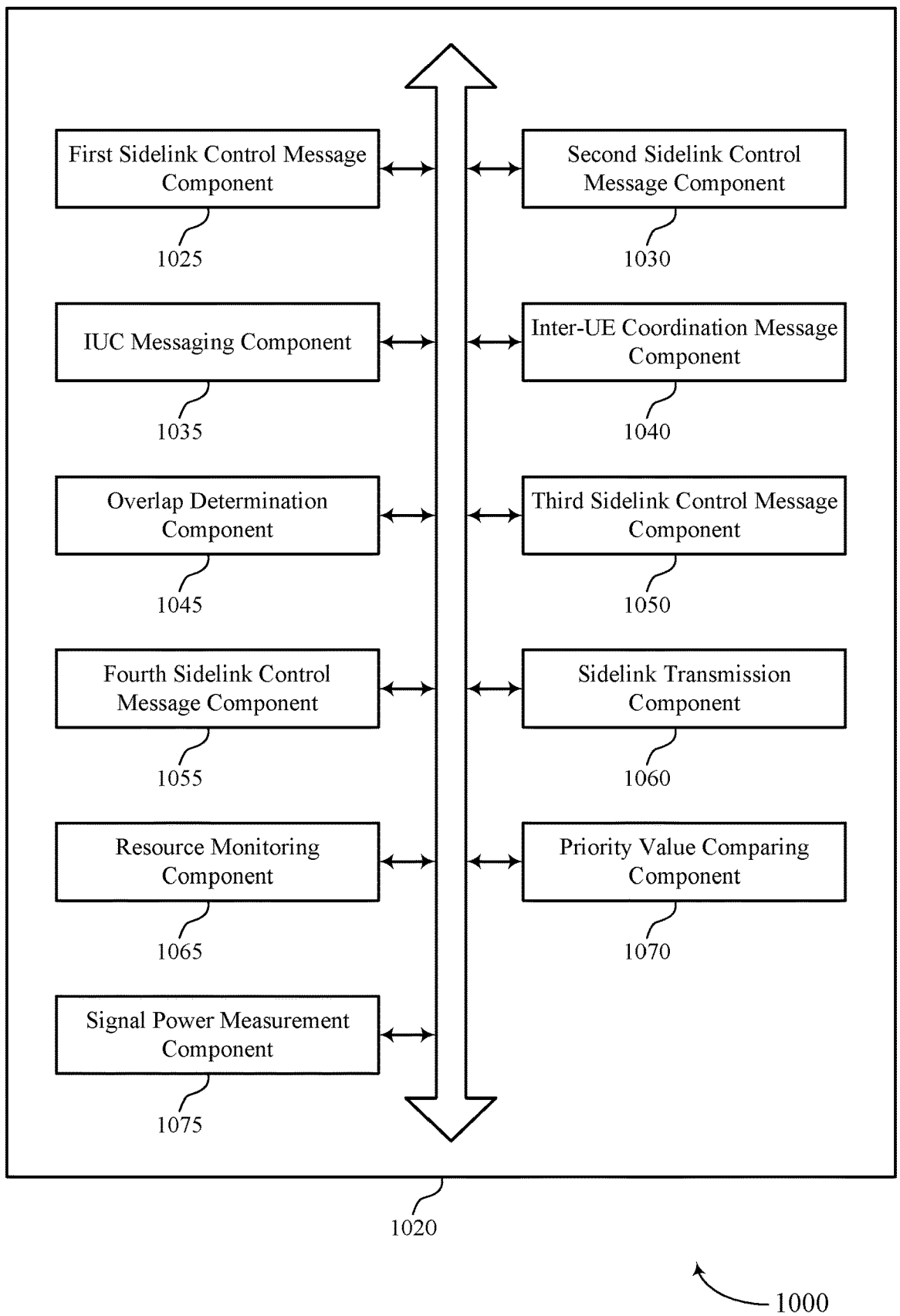
FIG. 10 shows a block diagram of a communications manager that supports IUC for beamformed communications in accordance with one or more aspects of the present disclosure.

FIG. 10 shows a block diagram 1000 of a communications manager 1020 that supports inter-user equipment coordination for beamformed communications in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of inter-user equipment coordination for beamformed communications as described herein. For example, the communications manager 1020 may include a first sidelink control message component 1025, a second sidelink control message component 1030, an IUC messaging component 1035, an IUC message component 1040, an overlap determination component 1045, a third sidelink control message component 1050, a fourth sidelink control message component 1055, a sidelink transmission component 1060, a resource monitoring component 1065, a priority value comparing component 1070, a signal power measurement component 1075, or any combination thereof. Each of these components may communicate, directly or indirectly, with one another (e.g., via one or more buses).

The communications manager 1020 may support wireless communication at a first UE in accordance with examples as disclosed herein. The first sidelink control message component 1025 may be configured as or otherwise support a means for receiving, using a first spatial filter, a first sidelink control message including a first sidelink resource reservation associated with a second UE. The second sidelink control message component 1030 may be configured as or otherwise support a means for receiving, using a second spatial filter, a second sidelink control message including a second sidelink resource reservation associated with a third UE. The IUC messaging component 1035 may be configured as or otherwise support a means for transmitting, to the second UE or to the third UE, an IUC message that indicates a conflict between the first sidelink resource reservation and the second sidelink resource reservation based on a relationship between the first spatial filter used to receive the first sidelink resource reservation and the second spatial filter used to receive the second sidelink resource reservation.

In some examples, the first sidelink resource reservation indicates a first sidelink resource reserved by the second UE for transmission to the first UE, the second sidelink resource reservation indicates a second sidelink resource reserved by the third UE for transmission to a fourth UE, and the overlap determination component 1045 may be configured as or otherwise support a means for determining that a first beam corresponding to the first spatial filter at least partially overlaps with a second beam corresponding to the second spatial filter, where transmitting, to the second UE or the third UE, the IUC message that indicates the conflict between the first sidelink resource reservation and the second sidelink resource reservation is based on the first beam at least partially overlapping with the second beam.

In some examples, the priority value comparing component 1070 may be configured as or otherwise support a means for comparing a first priority value of the first sidelink resource reservation associated with the second UE to a second priority value of the second sidelink resource reservation associated with the third UE, where the IUC message is transmitted to the second UE based on the first priority value being greater than the second priority value.

In some examples, the first sidelink resource reservation and the second sidelink resource reservation at least partially overlap in time and frequency.

In some examples, the first beam corresponding to the first spatial filter at least partially overlaps with the second beam corresponding to the second spatial filter based on a QCL relationship between the first spatial filter and the second spatial filter.

In some examples, to support determining that the first beam corresponding to the first spatial filter at least partially overlaps with the second beam corresponding to the second spatial filter, the signal power measurement component 1075 may be configured as or otherwise support a means for determining that a signal power for signaling received from the third UE using the first spatial filter satisfies a threshold. In some examples, to support determining that the first beam corresponding to the first spatial filter at least partially overlaps with the second beam corresponding to the second spatial filter, the signal power measurement component 1075 may be configured as or otherwise support a means for determining that a signal power for signaling received from the second UE using the second spatial filter satisfies the threshold.

In some examples, the first spatial filter and the second spatial filter are identical.

In some examples, the first spatial filter and the second spatial filter have identical spatial receiver parameters.

In some examples, the first sidelink resource reservation indicates a first sidelink resource reserved by the second UE for transmission to the first UE, the second sidelink resource reservation indicates a second sidelink resource reserved by the third UE for transmission to the first UE, and the overlap determination component 1045 may be configured as or otherwise support a means for determining that the first sidelink resource reservation and the second sidelink resource reservation at least partially overlap in time, where transmitting, to the second UE or to the third UE, the IUC message that indicates the conflict between the first sidelink resource reservation and the second sidelink resource reservation is based on the first sidelink resource reservation and the second sidelink resource reservation at least partially overlapping in time.

In some examples, the priority value comparing component 1070 may be configured as or otherwise support a means for comparing a first priority value of the first sidelink resource reservation associated with the second UE to a second priority value of the second sidelink resource reservation associated with the third UE, where the IUC message is transmitted to the second UE based on the first priority value being greater than the second priority value.

In some examples, a first beam corresponding to the first spatial filter and a second beam corresponding to the second spatial filter are spatially separated.

In some examples, the first spatial filter and the second spatial filter have different spatial receiver parameters.

In some examples, the IUC messaging component 1035 may be configured as or otherwise support a means for transmitting, to the second UE, the IUC message using the first spatial filter based on the first UE using the first spatial filter to receive the first sidelink control message.

In some examples, the IUC messaging component 1035 may be configured as or otherwise support a means for transmitting, to the third UE, the IUC message using the second spatial filter based on the first UE using the second spatial filter to receive the second sidelink control message.

In some examples, the third sidelink control message component 1050 may be configured as or otherwise support a means for receiving, using a third spatial filter corresponding to a first beam, a third sidelink control message indicating a third sidelink resource reserved by a fourth UE for transmission to the first UE. In some examples, the fourth sidelink control message component 1055 may be configured as or otherwise support a means for receiving, using a fourth spatial filter corresponding to a second beam, a fourth sidelink control message indicating a fourth sidelink resource reserved by a fifth UE for transmission to a sixth UE, where the fourth sidelink resource at least partially overlaps with the third sidelink resource in time and frequency. In some examples, the IUC messaging component 1035 may be configured as or otherwise support a means for refraining from transmitting a second IUC message that indicates a conflict between the third sidelink resource and the fourth sidelink resource based on the first beam being at least partially non-overlapping the second beam. In some examples, the sidelink transmission component 1060 may be configured as or otherwise support a means for receiving, using the first spatial filter, a first sidelink transmission from the fourth UE via the third sidelink resource.

In some examples, the IUC message includes a scheme-two IUC message.

Additionally, or alternatively, the communications manager 1020 may support wireless communication at a second UE in accordance with examples as disclosed herein. In some examples, the first sidelink control message component 1025 may be configured as or otherwise support a means for transmitting, using a first spatial filter, a first sidelink control message including a first sidelink resource reservation. The IUC message component 1040 may be configured as or otherwise support a means for receiving, using the first spatial filter, an IUC message from a first UE that indicates a conflict between the first sidelink resource reservation and a second sidelink resource reservation associated with a third UE, where the second UE uses the first spatial filter to receive the IUC message based on using the first spatial filter to transmit the first sidelink control message.

In some examples, the second sidelink control message component 1030 may be configured as or otherwise support a means for transmitting, using a second spatial filter, a second sidelink control message including a third sidelink resource reservation, where the first sidelink resource reservation and the third sidelink resource reservation both map to an IUC message opportunity. In some examples, the resource monitoring component 1065 may be configured as or otherwise support a means for refraining from monitoring resources of the IUC message opportunity for a second IUC message associated with the third sidelink resource reservation, where the IUC message that indicates the conflict between the first sidelink resource reservation and the second sidelink resource reservation is received via the resources of the IUC message opportunity based on refraining from monitoring the resources of the IUC message opportunity for the second IUC message.

In some examples, the priority value comparing component 1070 may be configured as or otherwise support a means for comparing a first priority value of the first sidelink resource reservation to a second priority value of the third sidelink resource reservation, where the IUC message is received using the first spatial filter based on the first priority value being greater than the second priority value.

In some examples, refraining from monitoring the resources of the IUC message opportunity for the second IUC message associated with the third sidelink resource reservation is based on the first priority value being greater than the second priority value.

In some examples, the IUC message includes a scheme-two IUC message.

Figure 11:
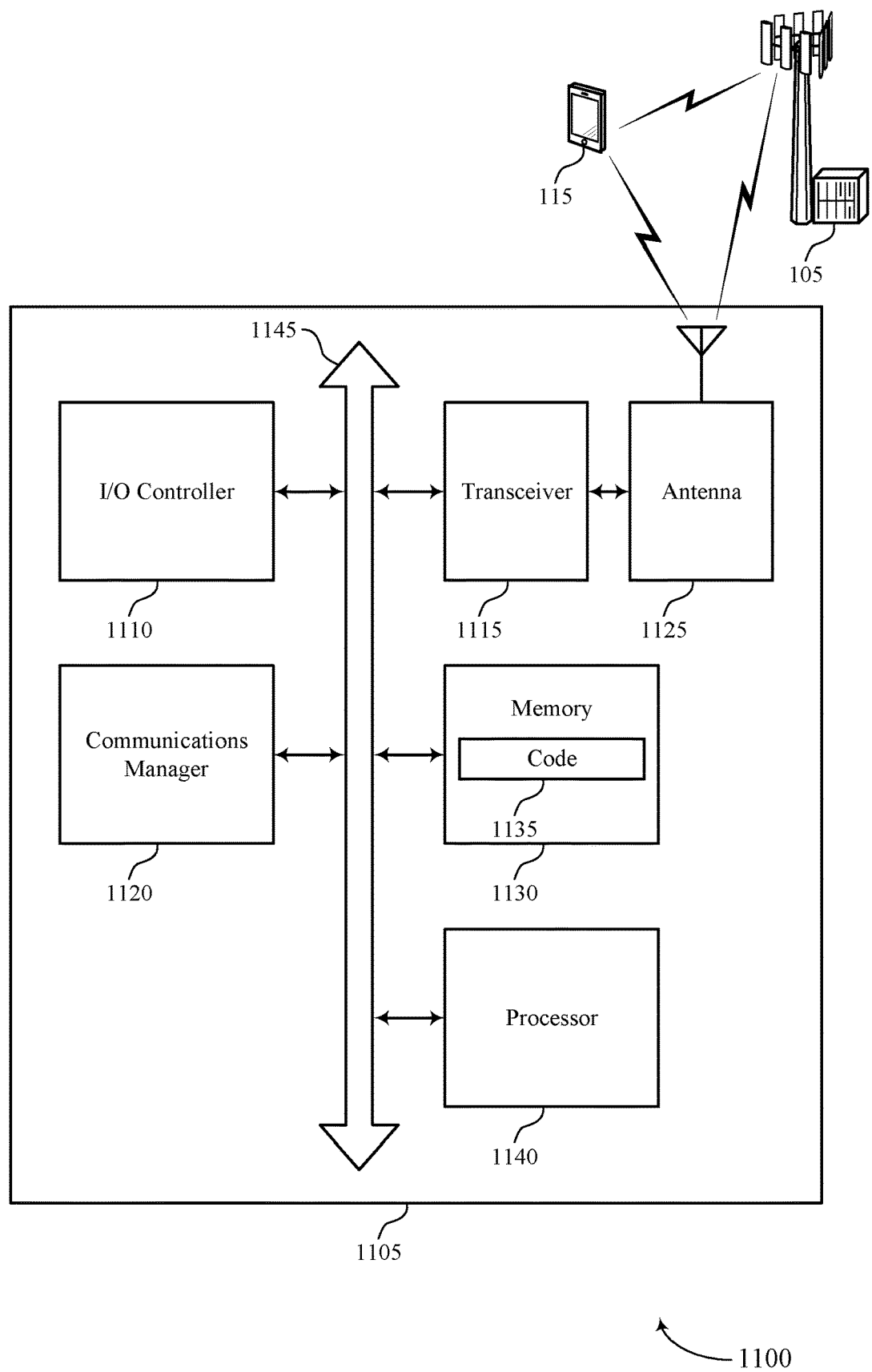
FIG. 11 shows a diagram of a system including a device that IUC for beamformed communications in accordance with one or more aspects of the present disclosure.

FIG. 11 shows a diagram of a system 1100 including a device 1105 that supports inter-user equipment coordination for beamformed communications in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting inter-user equipment coordination for beamformed communications). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a first UE in accordance with examples as disclosed herein. For example, the communications manager 1120 may be configured as or otherwise support a means for receiving, using a first spatial filter, a first sidelink control message including a first sidelink resource reservation associated with a second UE. The communications manager 1120 may be configured as or otherwise support a means for receiving, using a second spatial filter, a second sidelink control message including a second sidelink resource reservation associated with a third UE. The communications manager 1120 may be configured as or otherwise support a means for transmitting, to the second UE or to the third UE, an IUC message that indicates a conflict between the first sidelink resource reservation and the second sidelink resource reservation based on a relationship between the first spatial filter used to receive the first sidelink resource reservation and the second spatial filter used to receive the second sidelink resource reservation.

Additionally, or alternatively, the communications manager 1120 may support wireless communication at a second UE in accordance with examples as disclosed herein. For example, the communications manager 1120 may be configured as or otherwise support a means for transmitting, using a first spatial filter, a first sidelink control message including a first sidelink resource reservation. The communications manager 1120 may be configured as or otherwise support a means for receiving, using the first spatial filter, an IUC message from a first UE that indicates a conflict between the first sidelink resource reservation and a second sidelink resource reservation associated with a third UE, where the second UE uses the first spatial filter to receive the IUC message based on using the first spatial filter to transmit the first sidelink control message.

By including or configuring the communications manager 1120 in accordance with examples as described herein, the device 1105 may support techniques for inter-user equipment coordination (IUC) for beamformed communications, which may result in improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of inter-user equipment coordination for beamformed communications as described herein, or the processor 1140 and the memory 1130 may be otherwise configured to perform or support such operations.

Figure 12:
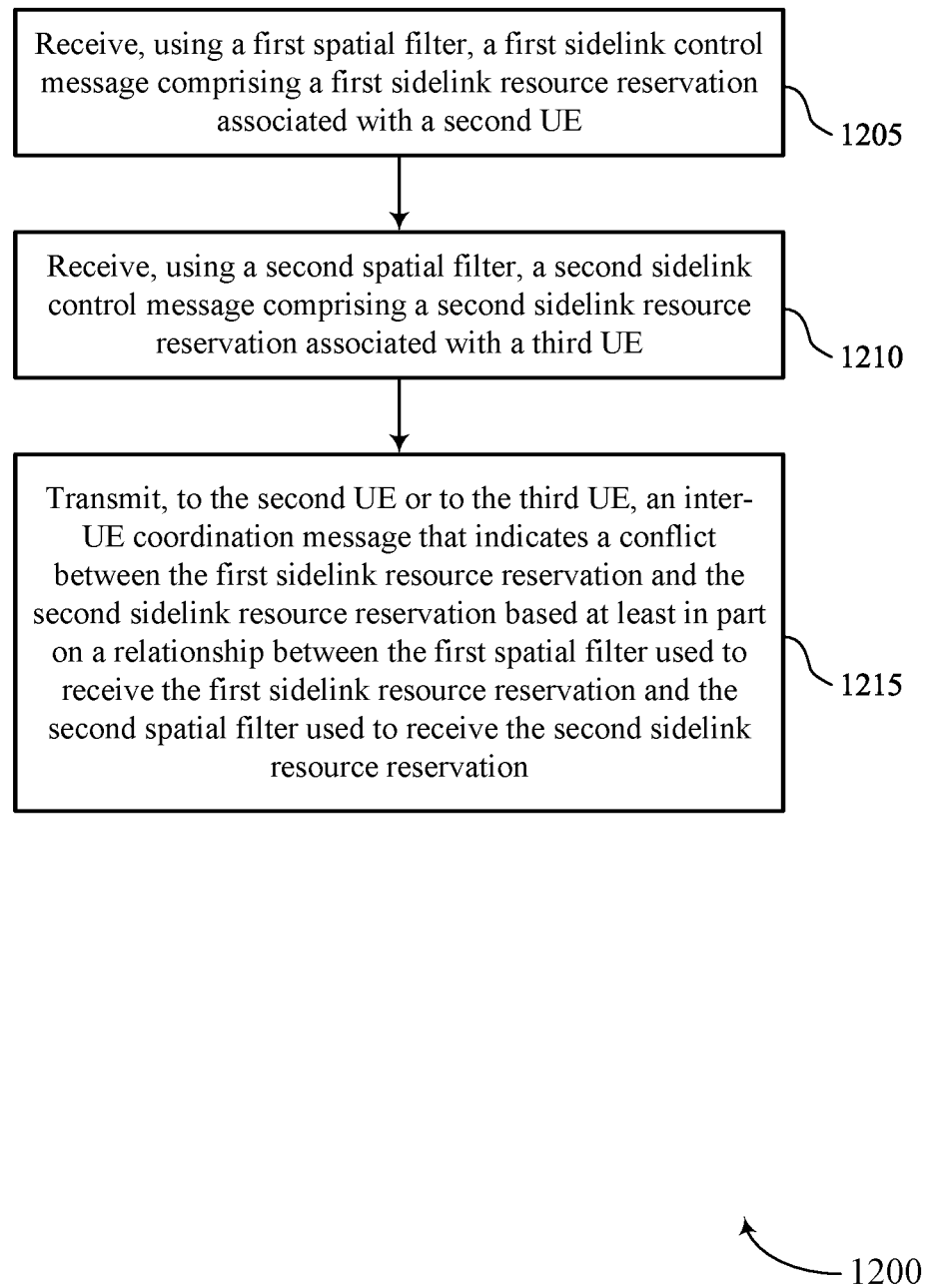
FIGS. 12 through 15 show flowcharts illustrating methods that support IUC for beamformed communications in accordance with one or more aspects of the present disclosure.

FIG. 12 shows a flowchart illustrating a method 1200 that supports inter-user equipment coordination for beamformed communications in accordance with one or more aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1205, the method may include receiving, using a first spatial filter, a first sidelink control message including a first sidelink resource reservation associated with a second UE. The operations of 1205 may be performed in accordance with examples as disclosed herein. In some examples, aspects of the operations of 1205 may be performed by a first sidelink control message component 1025 as described with reference to FIG. 10.

At 1210, the method may include receiving, using a second spatial filter, a second sidelink control message including a second sidelink resource reservation associated with a third UE. The operations of 1210 may be performed in accordance with examples as disclosed herein. In some examples, aspects of the operations of 1210 may be performed by a second sidelink control message component 1030 as described with reference to FIG. 10.

At 1215, the method may include transmitting, to the second UE or to the third UE, an IUC message that indicates a conflict between the first sidelink resource reservation and the second sidelink resource reservation based on a relationship between the first spatial filter used to receive the first sidelink resource reservation and the second spatial filter used to receive the second sidelink resource reservation. The operations of 1215 may be performed in accordance with examples as disclosed herein. In some examples, aspects of the operations of 1215 may be performed by an IUC messaging component 1035 as described with reference to FIG. 10.

Figure 13:
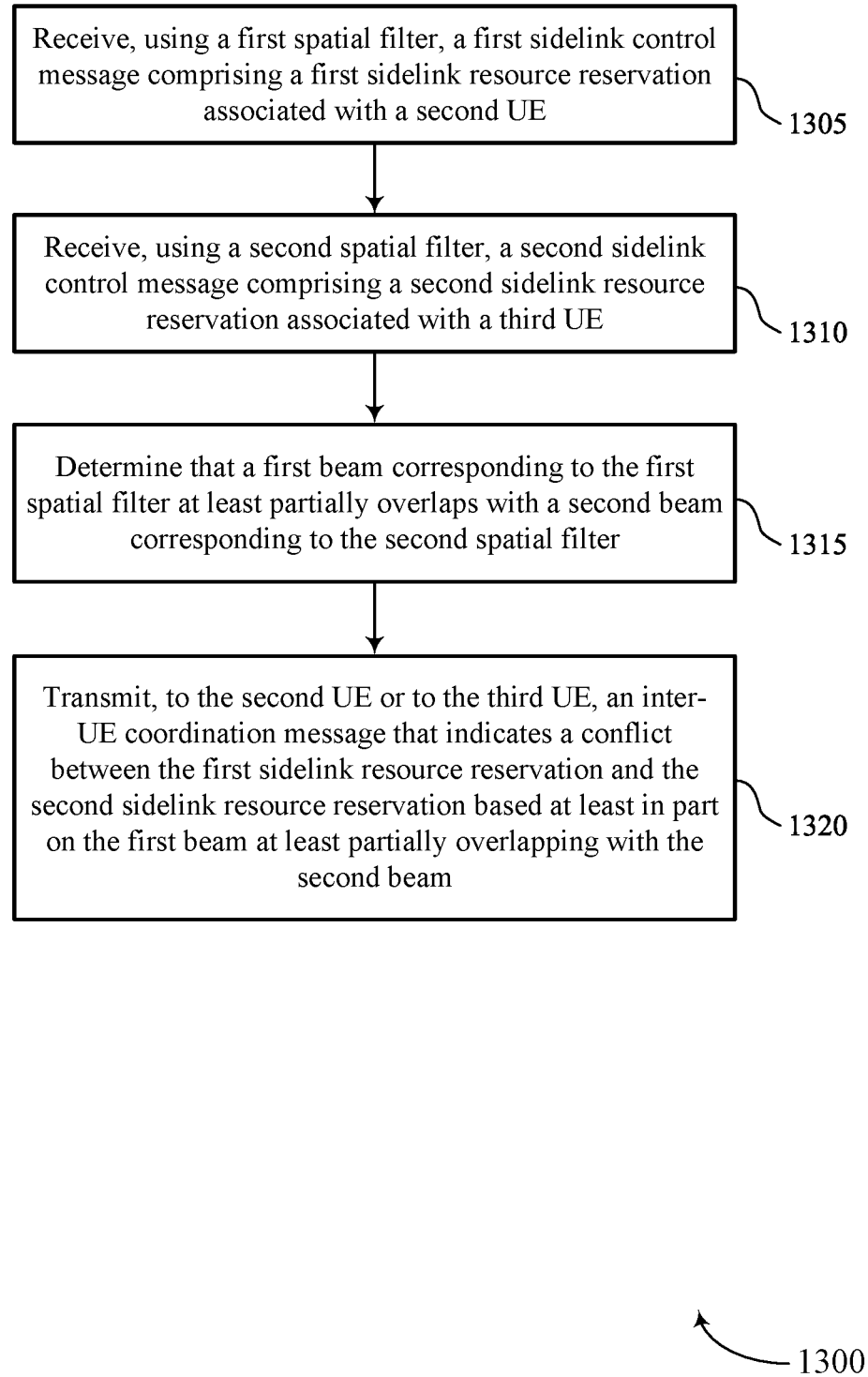

FIG. 13 shows a flowchart illustrating a method 1300 that supports inter-user equipment coordination for beamformed communications in accordance with one or more aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1305, the method may include receiving, using a first spatial filter, a first sidelink control message including a first sidelink resource reservation associated with a second UE. The operations of 1305 may be performed in accordance with examples as disclosed herein. In some examples, aspects of the operations of 1305 may be performed by a first sidelink control message component 1025 as described with reference to FIG. 10.

At 1310, the method may include receiving, using a second spatial filter, a second sidelink control message including a second sidelink resource reservation associated with a third UE. The operations of 1310 may be performed in accordance with examples as disclosed herein. In some examples, aspects of the operations of 1310 may be performed by a second sidelink control message component 1030 as described with reference to FIG. 10.

At 1315, the method may include determining that a first beam corresponding to the first spatial filter at least partially overlaps with a second beam corresponding to the second spatial filter. The operations of 1315 may be performed in accordance with examples as disclosed herein. In some examples, aspects of the operations of 1315 may be performed by an overlap determination component 1045 as described with reference to FIG. 10.

At 1320, the method may include transmitting, to the second UE or to the third UE, an IUC message that indicates a conflict between the first sidelink resource reservation and the second sidelink resource reservation based at least in part on the first beam at least partially overlapping with the second beam. The operations of 1320 may be performed in accordance with examples as disclosed herein. In some examples, aspects of the operations of 1320 may be performed by an IUC messaging component 1035 as described with reference to FIG. 10.

Figure 14:
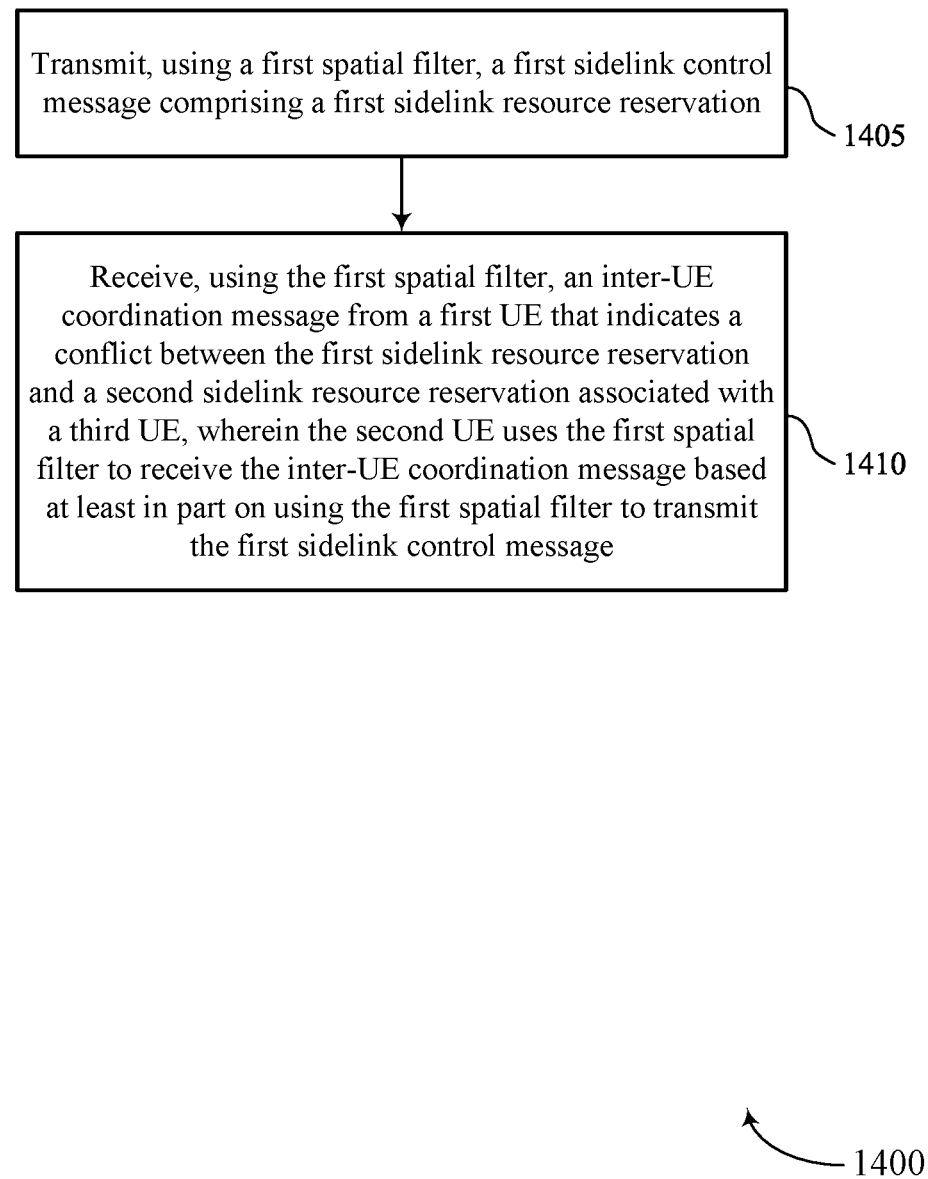

FIG. 14 shows a flowchart illustrating a method 1400 that supports inter-user equipment coordination for beamformed communications in accordance with one or more aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1405, the method may include transmitting, using a first spatial filter, a first sidelink control message including a first sidelink resource reservation. The operations of 1405 may be performed in accordance with examples as disclosed herein. In some examples, aspects of the operations of 1405 may be performed by a first sidelink control message component 1025 as described with reference to FIG. 10.

At 1410, the method may include receiving, using the first spatial filter, an IUC message from a first UE that indicates a conflict between the first sidelink resource reservation and a second sidelink resource reservation associated with a third UE, where the second UE uses the first spatial filter to receive the IUC message based on using the first spatial filter to transmit the first sidelink control message. The operations of 1410 may be performed in accordance with examples as disclosed herein. In some examples, aspects of the operations of 1410 may be performed by an IUC message component 1040 as described with reference to FIG. 10.

Figure 15:
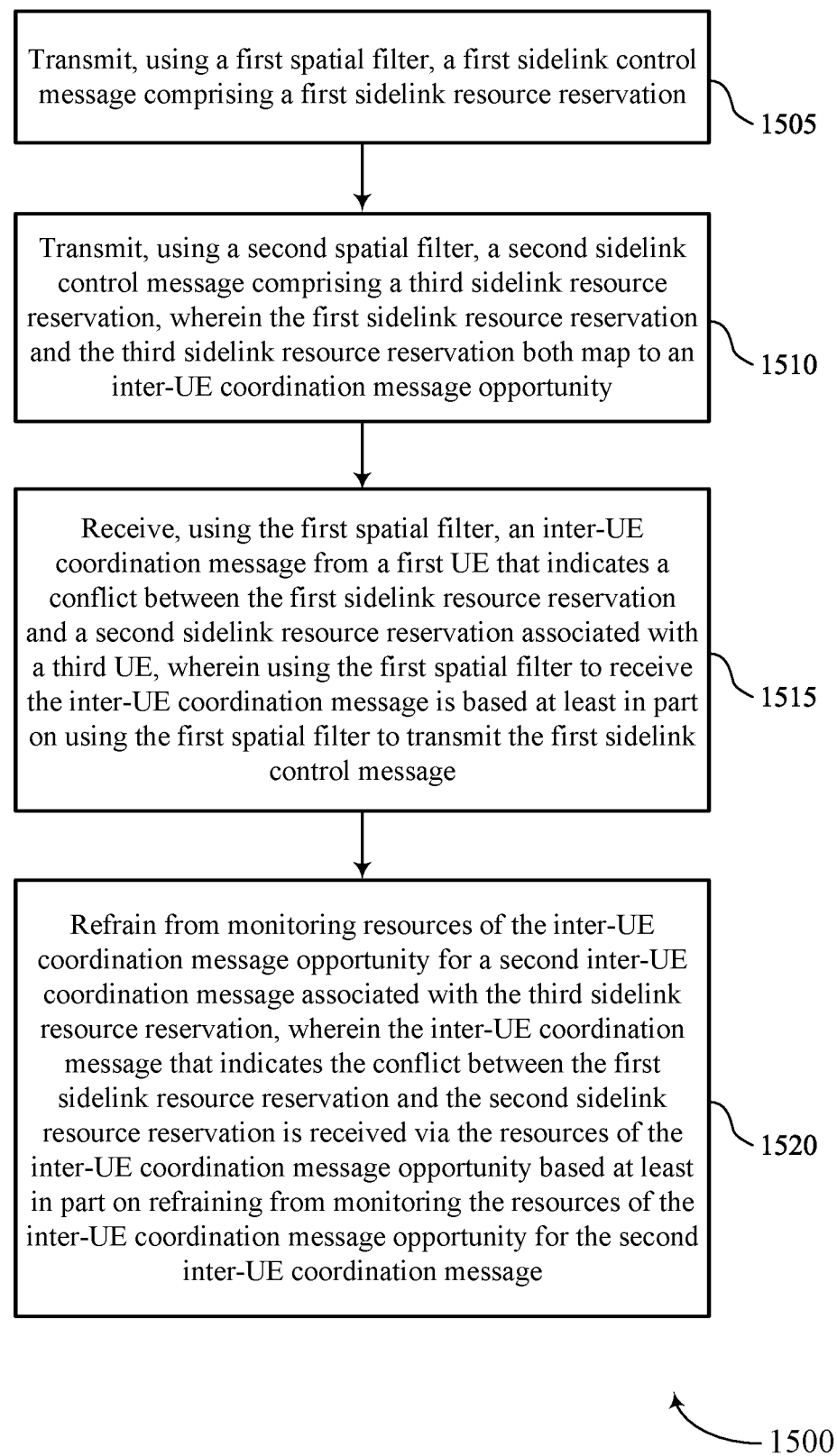

FIG. 15 shows a flowchart illustrating a method 1500 that supports inter-user equipment coordination for beamformed communications in accordance with one or more aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1505, the method may include transmitting, using a first spatial filter, a first sidelink control message including a first sidelink resource reservation. The operations of 1505 may be performed in accordance with examples as disclosed herein. In some examples, aspects of the operations of 1505 may be performed by a first sidelink control message component 1025 as described with reference to FIG. 10.

At 1510, the method may include transmitting, using a second spatial filter, a second sidelink control message including a third sidelink resource reservation, where the first sidelink resource reservation and the third sidelink resource reservation both map to an IUC message opportunity. The operations of 1510 may be performed in accordance with examples as disclosed herein. In some examples, aspects of the operations of 1510 may be performed by a second sidelink control message component 1030 as described with reference to FIG. 10.

At 1515, the method may include receiving, using the first spatial filter, an IUC message from a first UE that indicates a conflict between the first sidelink resource reservation and a second sidelink resource reservation associated with a third UE, where using the first spatial filter to receive the IUC message is based on using the first spatial filter to transmit the first sidelink control message. The operations of 1515 may be performed in accordance with examples as disclosed herein. In some examples, aspects of the operations of 1515 may be performed by an IUC message component 1040 as described with reference to FIG. 10.

At 1520, the method may include refraining from monitoring resources of the IUC message opportunity for a second IUC message associated with the third sidelink resource reservation, where the IUC message that indicates the conflict between the first sidelink resource reservation and the second sidelink resource reservation is received via the resources of the IUC message opportunity based on refraining from monitoring the resources of the IUC message opportunity for the second IUC message. The operations of 1520 may be performed in accordance with examples as disclosed herein. In some examples, aspects of the operations of 1520 may be performed by a resource monitoring component 1065 as described with reference to FIG. 10.

The following provides an overview of aspects of the present disclosure:

Aspect 1: A method for wireless communication at a first UE, comprising: receiving, using a first spatial filter, a first sidelink control message comprising a first sidelink resource reservation associated with a second UE; receiving, using a second spatial filter, a second sidelink control message comprising a second sidelink resource reservation associated with a third UE; and transmitting, to the second UE or to the third UE, an IUC message that indicates a conflict between the first sidelink resource reservation and the second sidelink resource reservation based at least in part on a relationship between the first spatial filter used to receive the first sidelink resource reservation and the second spatial filter used to receive the second sidelink resource reservation.

Aspect 2: The method of aspect 1, wherein the first sidelink resource reservation indicates a first sidelink resource reserved by the second UE for transmission to the first UE, and the second sidelink resource reservation indicates a second sidelink resource reserved by the third UE for transmission to a fourth UE, the method further comprising: determining that a first beam corresponding to the first spatial filter at least partially overlaps with a second beam corresponding to the second spatial filter, wherein transmitting, to the second UE or the third UE, the IUC message that indicates the conflict between the first sidelink resource reservation and the second sidelink resource reservation is based at least in part on the first beam at least partially overlapping with the second beam.

Aspect 3: The method of aspect 2, further comprising: comparing a first priority value of the first sidelink resource reservation associated with the second UE to a second priority value of the second sidelink resource reservation associated with the third UE, wherein the IUC message is transmitted to the second UE based at least in part on the first priority value being greater than the second priority value.

Aspect 4: The method of any of aspects 2 through 3, wherein the first sidelink resource reservation and the second sidelink resource reservation at least partially overlap in time and frequency.

Aspect 5: The method of any of aspects 2 through 4, wherein the first beam corresponding to the first spatial filter at least partially overlaps with the second beam corresponding to the second spatial filter based at least in part on a quasi-colocation relationship between the first spatial filter and the second spatial filter.

Aspect 6: The method of any of aspects 2 through 5, wherein determining that the first beam corresponding to the first spatial filter at least partially overlaps with the second beam corresponding to the second spatial filter comprises: determining that a signal power for signaling received from the third UE using the first spatial filter satisfies a threshold; or determining that a signal power for signaling received from the second UE using the second spatial filter satisfies the threshold.

Aspect 7: The method of any of aspects 2 through 6, wherein the first spatial filter and the second spatial filter are identical.

Aspect 8: The method of any of aspects 2 through 7, wherein the first spatial filter and the second spatial filter have identical spatial receiver parameters.

Aspect 9: The method of any of aspects 1 through 8, wherein the first sidelink resource reservation indicates a first sidelink resource reserved by the second UE for transmission to the first UE, and the second sidelink resource reservation indicates a second sidelink resource reserved by the third UE for transmission to the first UE, the method further comprising: determining that the first sidelink resource reservation and the second sidelink resource reservation at least partially overlap in time, wherein transmitting, to the second UE or to the third UE, the IUC message that indicates the conflict between the first sidelink resource reservation and the second sidelink resource reservation is based at least in part on the first sidelink resource reservation and the second sidelink resource reservation at least partially overlapping in time.

Aspect 10: The method of aspect 9, further comprising: comparing a first priority value of the first sidelink resource reservation associated with the second UE to a second priority value of the second sidelink resource reservation associated with the third UE, wherein the IUC message is transmitted to the second UE based at least in part on the first priority value being greater than the second priority value.

Aspect 11: The method of any of aspects 9 through 10, wherein a first beam corresponding to the first spatial filter and a second beam corresponding to the second spatial filter are spatially separated.

Aspect 12: The method of any of aspects 9 through 11, wherein the first spatial filter and the second spatial filter have different spatial receiver parameters.

Aspect 13: The method of any of aspects 1 through 12, further comprising: transmitting, to the second UE, the IUC message using the first spatial filter based at least in part on the first UE using the first spatial filter to receive the first sidelink control message.

Aspect 14: The method of any of aspects 1 through 13, further comprising: transmitting, to the third UE, the IUC message using the second spatial filter based at least in part on the first UE using the second spatial filter to receive the second sidelink control message.

Aspect 15: The method of any of aspects 1 through 14, further comprising: receiving, using a third spatial filter corresponding to a first beam, a third sidelink control message indicating a third sidelink resource reserved by a fourth UE for transmission to the first UE; receiving, using a fourth spatial filter corresponding to a second beam, a fourth sidelink control message indicating a fourth sidelink resource reserved by a fifth UE for transmission to a sixth UE, wherein the fourth sidelink resource at least partially overlaps with the third sidelink resource in time and frequency; refraining from transmitting a second IUC message that indicates a conflict between the third sidelink resource and the fourth sidelink resource based at least in part on the first beam being at least partially non-overlapping the second beam; and receiving, using the first spatial filter, a first sidelink transmission from the fourth UE via the third sidelink resource.

Aspect 16: The method of any of aspects 1 through 15, wherein the IUC message comprises a scheme-two IUC message.

Aspect 17: A method for wireless communication at a second UE, comprising: transmitting, using a first spatial filter, a first sidelink control message comprising a first sidelink resource reservation; and receiving, using the first spatial filter, an IUC message from a first UE that indicates a conflict between the first sidelink resource reservation and a second sidelink resource reservation associated with a third UE, wherein the second UE uses the first spatial filter to receive the IUC message based at least in part on using the first spatial filter to transmit the first sidelink control message.

Aspect 18: The method of aspect 17, further comprising: transmitting, using a second spatial filter, a second sidelink control message comprising a third sidelink resource reservation, wherein the first sidelink resource reservation and the third sidelink resource reservation both map to an IUC message opportunity; and refraining from monitoring resources of the IUC message opportunity for a second IUC message associated with the third sidelink resource reservation, wherein the IUC message that indicates the conflict between the first sidelink resource reservation and the second sidelink resource reservation is received via the resources of the IUC message opportunity based at least in part on refraining from monitoring the resources of the IUC message opportunity for the second IUC message.

Aspect 19: The method of aspect 18, further comprising: comparing a first priority value of the first sidelink resource reservation to a second priority value of the third sidelink resource reservation, wherein the IUC message is received using the first spatial filter based at least in part on the first priority value being greater than the second priority value.

Aspect 20: The method of aspect 19, wherein refraining from monitoring the resources of the IUC message opportunity for the second IUC message associated with the third sidelink resource reservation is based at least in part on the first priority value being greater than the second priority value.

Aspect 21: The method of any of aspects 17 through 20, wherein the IUC message comprises a scheme-two IUC message.

Aspect 22: An apparatus for wireless communication at a first UE, comprising a processor; memory coupled with the processor; and instructions stored in the memory and executable by the processor to cause the apparatus to perform a method of any of aspects 1 through 16.

Aspect 23: An apparatus for wireless communication at a first UE, comprising at least one means for performing a method of any of aspects 1 through 16.

Aspect 24: A non-transitory computer-readable medium storing code for wireless communication at a first UE, the code comprising instructions executable by a processor to perform a method of any of aspects 1 through 16.

Aspect 25: An apparatus for wireless communication at a second UE, comprising a processor; memory coupled with the processor; and instructions stored in the memory and executable by the processor to cause the apparatus to perform a method of any of aspects 17 through 21.

Aspect 26: An apparatus for wireless communication at a second UE, comprising at least one means for performing a method of any of aspects 17 through 21.

Aspect 27: A non-transitory computer-readable medium storing code for wireless communication at a second UE, the code comprising instructions executable by a processor to perform a method of any of aspects 17 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first user equipment (UE), comprising:
   one or more memories storing processor-executable code; and
   one or more processors coupled with the one or more memories and individually or collectively operable to execute the code to cause the first UE to:
      receive, using a first spatial filter, a first sidelink control message comprising a first sidelink resource reservation associated with a second UE;
      receive, using a second spatial filter, a second sidelink control message comprising a second sidelink resource reservation associated with a third UE; and
      transmit, to the second UE or to the third UE, an inter-UE coordination message that indicates a conflict between the first sidelink resource reservation and the second sidelink resource reservation based at least in part on a relationship between the first spatial filter used to receive the first sidelink resource reservation and the second spatial filter used to receive the second sidelink resource reservation.

2. The first UE of claim 1, wherein the first sidelink resource reservation indicates a first sidelink resource reserved by the second UE for transmission to the first UE, wherein the second sidelink resource reservation indicates a second sidelink resource reserved by the third UE for transmission to a fourth UE, and wherein the one or more processors are individually or collectively further operable to execute the code to cause the first UE to:
   determine that a first beam corresponding to the first spatial filter at least partially overlaps with a second beam corresponding to the second spatial filter, wherein the instructions are executable by the processor to cause the apparatus to transmit, to the second UE or the third UE, the inter-UE coordination message that indicates the conflict between the first sidelink resource reservation and the second sidelink resource reservation based at least in part on the first beam at least partially overlapping with the second beam.

3. The first UE of claim 2, wherein the one or more processors are individually or collectively further operable to execute the code to cause the first UE to:
   compare a first priority value of the first sidelink resource reservation associated with the second UE to a second priority value of the second sidelink resource reservation associated with the third UE, wherein the instructions are executable by the processor to cause the apparatus to transmit the inter-UE coordination message to the second UE based at least in part on the first priority value being greater than the second priority value.

4. The first UE of claim 2, wherein the first sidelink resource reservation and the second sidelink resource reservation at least partially overlap in time and frequency.

5. The first UE of claim 2, wherein the first beam corresponding to the first spatial filter at least partially overlaps with the second beam corresponding to the second spatial filter based at least in part on a quasi-colocation relationship between the first spatial filter and the second spatial filter.

6. The first UE of claim 2, wherein, to determine that the first beam corresponding to the first spatial filter at least partially overlaps with the second beam corresponding to the second spatial filter, the one or more processors are individually or collectively further operable to execute the code to cause the first UE to:
   determine that a signal power for signaling received from the third UE using the first spatial filter satisfies a threshold; or
   determine that a signal power for signaling received from the second UE using the second spatial filter satisfies the threshold.

7. The first UE of claim 2, wherein the first spatial filter and the second spatial filter are identical.

8. The first UE of claim 2, wherein the first spatial filter and the second spatial filter have identical spatial receiver parameters.

9. The first UE of claim 1, wherein the first sidelink resource reservation indicates a first sidelink resource reserved by the second UE for transmission to the first UE, wherein the second sidelink resource reservation indicates a second sidelink resource reserved by the third UE for transmission to the first UE, and wherein the one or more processors are individually or collectively further operable to execute the code to cause the first UE to:
   determine that the first sidelink resource reservation and the second sidelink resource reservation at least partially overlap in time, wherein the instructions are executable by the processor to cause the apparatus to transmit, to the second UE or to the third UE, the inter-UE coordination message that indicates the conflict between the first sidelink resource reservation and the second sidelink resource reservation based at least in part on the first sidelink resource reservation and the second sidelink resource reservation at least partially overlapping in time.

10. The first UE of claim 9, wherein the one or more processors are individually or collectively further operable to execute the code to cause the first UE to:
compare a first priority value of the first sidelink resource reservation associated with the second UE to a second priority value of the second sidelink resource reservation associated with the third UE, wherein the instructions are executable by the processor to cause the apparatus to transmit the inter-UE coordination message to the second UE based at least in part on the first priority value being greater than the second priority value.

11. The first UE of claim 9, wherein a first beam corresponding to the first spatial filter and a second beam corresponding to the second spatial filter are spatially separated.

12. The first UE of claim 9, wherein the first spatial filter and the second spatial filter have different spatial receiver parameters.

13. The first UE of claim 1, wherein the one or more processors are individually or collectively further operable to execute the code to cause the first UE to:
transmit, to the second UE, the inter-UE coordination message using the first spatial filter based at least in part on the first UE using the first spatial filter to receive the first sidelink control message.

14. The first UE of claim 1, wherein the one or more processors are individually or collectively further operable to execute the code to cause the first UE to:
transmit, to the third UE, the inter-UE coordination message using the second spatial filter based at least in part on the first UE using the second spatial filter to receive the second sidelink control message.

15. The first UE of claim 1, wherein the one or more processors are individually or collectively further operable to execute the code to cause the first UE to:
receive, using a third spatial filter corresponding to a first beam, a third sidelink control message indicating a third sidelink resource reserved by a fourth UE for transmission to the first UE;
receive, using a fourth spatial filter corresponding to a second beam, a fourth sidelink control message indicating a fourth sidelink resource reserved by a fifth UE for transmission to a sixth UE, wherein the fourth sidelink resource at least partially overlaps with the third sidelink resource in time and frequency;
refrain from transmitting a second inter-UE coordination message that indicates a conflict between the third sidelink resource and the fourth sidelink resource based at least in part on the first beam being at least partially non-overlapping the second beam; and
receive, using the first spatial filter, a first sidelink transmission from the fourth UE via the third sidelink resource.

16. The first UE of claim 1, wherein the inter-UE coordination message comprises a scheme-two inter-UE coordination message.

17. A second user equipment (UE), comprising:
one or more memories storing processor-executable code; and
one or more processors coupled with the one or more memories and individually or collectively operable to execute the code to cause the second UE to:
transmit, using a first spatial filter, a first sidelink control message comprising a first sidelink resource reservation;
receive, using the first spatial filter, an inter-UE coordination message from a first UE that indicates a conflict between the first sidelink resource reservation and a second sidelink resource reservation associated with a third UE, wherein the one or more processors are individually or collectively further operable to execute the code to cause the second UE to use the first spatial filter to receive the inter-UE coordination message based at least in part on using the first spatial filter to transmit the first sidelink control message;
transmit, using a second spatial filter, a second sidelink control message comprising a third sidelink resource reservation, wherein the first sidelink resource reservation and the third sidelink resource reservation both map to an inter-UE coordination message opportunity; and
refrain from monitoring resources of the inter-UE coordination message opportunity for a second inter-UE coordination message associated with the third sidelink resource reservation, wherein the instructions are executable by the processor to cause the apparatus to receive the inter-UE coordination message that indicates the conflict between the first sidelink resource reservation and the second sidelink resource reservation via the resources of the inter-UE coordination message opportunity based at least in part on refraining from monitoring the resources of the inter-UE coordination message opportunity for the second inter-UE coordination message.

18. The second UE of claim 17, wherein the inter-UE coordination message comprises a scheme-two inter-UE coordination message.

19. The second UE of claim 17, wherein the one or more processors are individually or collectively further operable to execute the code to cause the second UE to:
compare a first priority value of the first sidelink resource reservation to a second priority value of the third sidelink resource reservation, wherein the instructions are executable by the processor to cause the apparatus to receive the inter-UE coordination message using the first spatial filter based at least in part on the first priority value being greater than the second priority value.

20. The second UE of claim 19, wherein the instructions are executable by the processor to cause the apparatus to refrain from monitoring the resources of the inter-UE coordination message opportunity for the second inter-UE coordination message associated with the third sidelink resource reservation based at least in part on the first priority value being greater than the second priority value.

21. A method for wireless communication at a first user equipment (UE), comprising:
receiving, using a first spatial filter, a first sidelink control message comprising a first sidelink resource reservation associated with a second UE;
receiving, using a second spatial filter, a second sidelink control message comprising a second sidelink resource reservation associated with a third UE; and
transmitting, to the second UE or to the third UE, an inter-UE coordination message that indicates a conflict between the first sidelink resource reservation and the second sidelink resource reservation based at least in part on a relationship between the first spatial filter used to receive the first sidelink resource reservation and the second spatial filter used to receive the second sidelink resource reservation.

22. The method of claim 21, wherein the first sidelink resource reservation indicates a first sidelink resource reserved by the second UE for transmission to the first UE, and the second sidelink resource reservation indicates a second sidelink resource reserved by the third UE for transmission to a fourth UE, the method further comprising:
determining that a first beam corresponding to the first spatial filter at least partially overlaps with a second beam corresponding to the second spatial filter, wherein transmitting, to the second UE or the third UE, the inter-UE coordination message that indicates the conflict between the first sidelink resource reservation and the second sidelink resource reservation is based at least in part on the first beam at least partially overlapping with the second beam.

23. The method of claim 22, further comprising:
comparing a first priority value of the first sidelink resource reservation associated with the second UE to a second priority value of the second sidelink resource reservation associated with the third UE, wherein the inter-UE coordination message is transmitted to the second UE based at least in part on the first priority value being greater than the second priority value.

24. The method of claim 21, wherein the first sidelink resource reservation indicates a first sidelink resource reserved by the second UE for transmission to the first UE, and the second sidelink resource reservation indicates a second sidelink resource reserved by the third UE for transmission to the first UE, the method further comprising:
determining that the first sidelink resource reservation and the second sidelink resource reservation at least partially overlap in time, wherein transmitting, to the second UE or to the third UE, the inter-UE coordination message that indicates the conflict between the first sidelink resource reservation and the second sidelink resource reservation is based at least in part on the first sidelink resource reservation and the second sidelink resource reservation at least partially overlapping in time.

25. The method of claim 24, further comprising:
comparing a first priority value of the first sidelink resource reservation associated with the second UE to a second priority value of the second sidelink resource reservation associated with the third UE, wherein the inter-UE coordination message is transmitted to the second UE based at least in part on the first priority value being greater than the second priority value.

26. The method of claim 21, further comprising:
transmitting, to the second UE, the inter-UE coordination message using the first spatial filter based at least in part on the first UE using the first spatial filter to receive the first sidelink control message.

27. A method for wireless communication at a second user equipment (UE), comprising:
transmitting, using a first spatial filter, a first sidelink control message comprising a first sidelink resource reservation;
receiving, using the first spatial filter, an inter-UE coordination message from a first UE that indicates a conflict between the first sidelink resource reservation and a second sidelink resource reservation associated with a third UE, wherein the second UE uses the first spatial filter to receive the inter-UE coordination message based at least in part on using the first spatial filter to transmit the first sidelink control message;
transmitting, using a second spatial filter, a second sidelink control message comprising a third sidelink resource reservation, wherein the first sidelink resource reservation and the third sidelink resource reservation both map to an inter-UE coordination message opportunity; and
refraining from monitoring resources of the inter-UE coordination message opportunity for a second inter-UE coordination message associated with the third sidelink resource reservation, wherein the inter-UE coordination message that indicates the conflict between the first sidelink resource reservation and the second sidelink resource reservation is received via the resources of the inter-UE coordination message opportunity based at least in part on refraining from monitoring the resources of the inter-UE coordination message opportunity for the second inter-UE coordination message.

28. The method of claim 27, further comprising:
comparing a first priority value of the first sidelink resource reservation to a second priority value of the third sidelink resource reservation, wherein the inter-UE coordination message is received using the first spatial filter based at least in part on the first priority value being greater than the second priority value.

* * * * *